United States Patent [19]
Weber et al.

[11] Patent Number: 5,686,979
[45] Date of Patent: Nov. 11, 1997

[54] OPTICAL PANEL CAPABLE OF SWITCHING BETWEEN REFLECTIVE AND TRANSMISSIVE STATES

[75] Inventors: Michael F. Weber, Shoreview; Andrew J. Ouderkirk, Woodbury; David J. W. Aastuen, Farmington, all of Minn.

[73] Assignee: Minnesota Mining and Manufacturing Company, St. Paul, Minn.

[21] Appl. No.: 494,916

[22] Filed: Jun. 26, 1995

[51] Int. Cl.$^6$ ............................................. G02F 1/1335
[52] U.S. Cl. ................................................ 349/96; 359/487
[58] Field of Search ............................ 359/40, 41, 42, 359/48, 49, 50, 63, 74, 79, 73, 251, 256, 280, 487, 490, 498; 349/96, 101, 122, 98

[56] References Cited

U.S. PATENT DOCUMENTS

| | | | |
|---|---|---|---|
| Re. 34,605 | 5/1994 | Schrenk et al. | 359/359 |
| 3,565,985 | 2/1971 | Schrenk et al. | |
| 3,610,729 | 10/1971 | Rogers | 359/587 |
| 3,647,612 | 3/1972 | Schrenk et al. | 161/165 |
| 3,711,176 | 1/1973 | Alfrey, Jr. et al. | 350/1 |
| 3,759,647 | 9/1973 | Schrenk et al. | 425/131 |
| 3,773,882 | 11/1973 | Schrenk | 264/171 |
| 3,801,429 | 4/1974 | Schrenk et al. | 161/181 |
| 4,025,688 | 5/1977 | Nagy et al. | |
| 4,094,947 | 6/1978 | Alfrey, Jr. et al. | 264/171 |
| 4,268,127 | 5/1981 | Oshima et al. | |
| 4,285,577 | 8/1981 | Schuler | 350/403 |
| 4,310,584 | 1/1982 | Cooper et al. | |

(List continued on next page.)

FOREIGN PATENT DOCUMENTS

| | | | |
|---|---|---|---|
| 1 327 286 | 3/1994 | Canada | G02B 6/00 |
| 0 062 751 | 10/1981 | European Pat. Off. | G02B 1/08 |
| 0 469 732 | 2/1992 | European Pat. Off. | G02B 1/04 |
| 0 514 223 | 11/1992 | European Pat. Off. | G02B 5/08 |
| 0 573 905 A1 | 12/1993 | European Pat. Off. | |
| 0 606 939 A1 | 7/1994 | European Pat. Off. | |
| 0 606 940 A2 | 7/1994 | European Pat. Off. | |
| 60026303 | 2/1985 | Japan | |
| 63017023 | 1/1988 | Japan | |
| 4-29114 | 1/1992 | Japan | G02F 1/133 |
| 5-288910 | 11/1993 | Japan | G02B 5/18 |
| 6-11607 | 1/1994 | Japan | G02B 5/18 |
| 6095111 | 4/1994 | Japan | |
| 7159813 | 6/1995 | Japan | G02F 1/137 |
| 2 052 779 | 1/1981 | United Kingdom | |
| WO 91/09719 | 7/1991 | WIPO | B29C 43/20 |
| WO 94/11776 | 5/1994 | WIPO | |
| WO 94/29765 | 12/1994 | WIPO | |
| WO 95/17303 | 6/1995 | WIPO | B32B 7/02 |
| WO 95/17691 | 6/1995 | WIPO | G02B 5/30 |
| WO 95/17692 | 6/1995 | WIPO | G02B 5/30 |
| WO 95/17699 | 6/1995 | WIPO | G02F 1/1335 |

OTHER PUBLICATIONS

St. John et al., "Characterization of Reflective Cholesteric Liquid–Crystal Displays", *Journal Appl. Phys.*, 78(9), pp. 5253–5265 (Nov. 1, 1995).

Schrenk et al., "Coextruded Elastomeric Optical Interference Films", SPE Annual Technical Conference, Atlanta, Georgia, pp. 1703–1707 (1988).

(List continued on next page.)

*Primary Examiner*—William L. Sikes
*Assistant Examiner*—James A. Dudek
*Attorney, Agent, or Firm*—Gary L. Griswold; Walter N. Kirn, Jr.; H. Sanders Gwin, Jr.

[57] ABSTRACT

A device, comprising a switchable optical panel and means for switching the panel between a reflecting state and a transmitting state. The switchable optical panel includes a transparent optically active layer having a first and a second major surface, a first reflective polarizer disposed on the first major surface and a second reflective polarizer disposed on the second major surface. The optically active layer preferably comprises a liquid crystal device and the switching means preferably comprises a system of drying electronics for applying voltage across the liquid crystal device. The invention also includes a switchable window and a transflective optical display.

72 Claims, 8 Drawing Sheets

U.S. PATENT DOCUMENTS

| | | | |
|---|---|---|---|
| 4,435,047 | 3/1984 | Fergason . | |
| 4,446,305 | 5/1984 | Rogers et al. | 528/348 |
| 4,520,189 | 5/1985 | Rogers et al. | 528/331 |
| 4,521,588 | 6/1985 | Rogers et al. | 528/363 |
| 4,525,413 | 6/1985 | Rogers et al. | 428/212 |
| 4,540,623 | 9/1985 | Im et al. | 428/220 |
| 4,749,261 | 6/1988 | McLaughlin et al. | 350/339 |
| 4,783,150 | 11/1988 | Tabony | 350/351 |
| 4,799,772 | 1/1989 | Utsumi . | |
| 4,848,875 | 7/1989 | Baughman et al. | 350/331 R |
| 4,937,134 | 6/1990 | Schrenk et al. | 428/213 |
| 5,044,736 | 9/1991 | Jasjue et al. | 359/291 |
| 5,089,318 | 2/1992 | Shetty et al. | 428/212 |
| 5,093,739 | 3/1992 | Aida et al. . | |
| 5,094,788 | 3/1992 | Schrenk et al. | 264/171 |
| 5,094,793 | 3/1992 | Schrenk et al. | 264/171 |
| 5,095,210 | 3/1992 | Wheatley et al. | 250/339 |
| 5,103,337 | 4/1992 | Schrenk et al. | 359/359 |
| 5,113,270 | 5/1992 | Fergason | 359/37 |
| 5,122,905 | 6/1992 | Wheatley et al. | 359/586 |
| 5,122,906 | 6/1992 | Wheatley | 359/586 |
| 5,126,880 | 6/1992 | Wheatley et al. | 359/587 |
| 5,138,474 | 8/1992 | Arakawa . | |
| 5,139,340 | 8/1992 | Okumura . | |
| 5,149,578 | 9/1992 | Wheatley et al. | 428/213 |
| 5,164,856 | 11/1992 | Zhang et al. | 359/489 |
| 5,194,975 | 3/1993 | Akatsuka et al. . | |
| 5,200,843 | 4/1993 | Karasawa et al. . | |
| 5,202,074 | 4/1993 | Schrenk et al. | 264/241 |
| 5,217,794 | 6/1993 | Schrenk | 428/220 |
| 5,233,465 | 8/1993 | Wheatley et al. | 359/359 |
| 5,234,729 | 8/1993 | Wheatley et al. | 428/30 |
| 5,268,782 | 12/1993 | Wenz et al. . | |
| 5,269,995 | 12/1993 | Ramanathan et al. | 264/171 |
| 5,278,694 | 1/1994 | Wheatley et al. | 359/359 |
| 5,295,009 | 3/1994 | Barnik et al. | 359/65 |
| 5,309,422 | 5/1994 | Kuroki et al. . | |
| 5,316,703 | 5/1994 | Schrenk | 264/1.3 |
| 5,325,218 | 6/1994 | Willet et al. | 359/65 |
| 5,339,179 | 8/1994 | Rudisill et al. . | |
| 5,339,198 | 8/1994 | Wheatley et al. | 359/359 |
| 5,360,659 | 11/1994 | Arends et al. | 428/216 |
| 5,389,324 | 2/1995 | Lewis et al. | 264/171 |
| 5,422,756 | 6/1995 | Weber | 359/487 |
| 5,424,119 | 6/1995 | Phillips et al. | 428/328 |
| 5,448,804 | 9/1995 | Schrenk et al. | 359/584 |
| 5,451,449 | 9/1995 | Shetty et al. | 428/195 |
| 5,486,949 | 1/1996 | Schrenk et al. | 359/498 |
| 5,540,978 | 7/1996 | Schrenk | 428/212 |
| 5,552,927 | 9/1996 | Wheatley et al. | 359/359 |
| 5,568,316 | 10/1996 | Schrenk et al. | 359/584 |

OTHER PUBLICATIONS

Schrenk et al., "Coextruded Infrared Reflecting Films", 7th Annual Meeting Polymer Processing Society, Hamilton, Ontario, Canada, pp. 222–223 (Apr. 1991).

Schrenk et al., "Coextruded Iridescent Film", TAPPI Paper Synthetics Conference, Atlanta, Georgia, pp. 141–145 (Sep. 1976).

Im et al., "Coextruded Microlayer Film and Sheet", *Journal of Plastic Film and Sheeting*, vol. 4, pp. 104–115 (Apr. 1988).

Hodgkinson et al., "Effective Principal Refractive Indices and Column Angles for Periodic Stacks of Thin Birefringent Films", *J. Opt. Soc. Am. A*, vol. 10, No. 9, pp. 2065–2071 (Sep. 1993).

Wu et al., "High Transparent Sheet Polarizer Made with Birefringent Materials", *Jpn. J. Appl. Phys.*, vol. 34, pp. 997–999, part 2, No. 8A (Aug. 1995).

Schrenk et al., "Interfacial Flow Instability in Multilayer Coextrusion", *Polymer Engineering Science*, vol. 18, No. 8, pp. 620–623 (Jun. 1978).

Shrenk, "New Developments in Coextrusion", Int'l. Conference on Advances In Polymer Processing, New Orleans, Louisana (Apr., 1991).

MacLeod, *Thin Film Optical Filters*, Adam Hilger Ltd: London (1969).

Mills, "Windows as Luminaries" *IAEEL Newsletter*, pp. 11–13 (Mar.–Apr. 1995).

Weber, M.F., "P–61: Retroreflecting Sheet Polarizer," 1993 SID International Symposium, Digest of Technical Papers, Seattle, vol. 24, Pt. 1, pp. 669–672 (May 16–21, 1993).

Makas, A. et al., "Dichroic and Reflective Polarizers in Lighting Applications," *Illuminating Engineering*, vol. LX (Apr. 1965), pp. 203–216.

Schrenk et al., "Coextruded Multilayer Polymer Films and Sheets," *Polymer Blends*, vol. 2, Ch. 15, pp. 129–165 (1978).

"Physical Optics of Iridescent Multilayered Plastic Films," Alfrey et al., *Polymer Engineering and Science*, Nov. 1969, vol. 9, No. 6, pp. 400–404.

"Reflectivity of Iridescent Coextruded Multilayered Plastic Films," Radford et al., Presented at the American Chemical Society symposium on Coextruded Plastic Films, Fibers, and Composites, Apr. 9–14, 1972.

OPTICAL PANEL CAPABLE OF SWITCHING BETWEEN REFLECTIVE AND TRANSMISSIVE STATES

FIELD OF THE INVENTION

The present invention relates to an optical device which can be switched between a reflecting state and a transmitting state. The invention also relates to a switchable window and a transflective optical display, each comprising such a switchable optical device.

BACKGROUND OF THE INVENTION

Windows which can be switched between an open (transmissive) and a is closed (non-transmissive) state are commonly used in privacy windows and privacy curtains. Current technologies used in such windows are generally based on either optical absorption or optical scattering mechanisms. When an optically absorptive window is in the closed state, much of the light incident on the window is absorbed and the window appears darkly opaque. This type of window can be undesirable because of excessive heat buildup when the window is exposed to sunlight. Examples of such windows are electrochromic devices and liquid crystal display (LCD) shutters having absorbing polarizers.

A window employing an optical scattering mechanism causes light to be diffusely scattered in the forward direction when in the closed state so that the window appears white. As a result, the window does not substantially block incident light and is not useful for energy control in structures such as homes and office buildings. Such a window is described in U.S. Pat. No. 4,435,047.

Optical displays, such as LCDs, are widely used for laptop computers, hand-held calculators, digital watches, and the like. In the conventional LCD assembly, a liquid crystal panel with an electrode matrix is located between a front absorptive polarizer and a rear absorptive polarizer. In the LCD, portions of the liquid crystal have their optical state altered by the application of an electric field. This process generates the contrast necessary to display picture elements, or pixels, of information in polarized light.

Typically the absorptive polarizers use dichroic dyes which absorb light of one polarization orientation more strongly than that of the orthogonal polarization orientation. In general, the transmission axis of the front polarizer is "crossed" with the transmission axis of the rear polarizer. The crossing angle can vary between zero and ninety degrees.

Optical displays can be classified based upon the source of illumination. Reflective displays are illuminated by ambient light that enters the display from the front. Typically a brushed aluminum reflector is placed behind the LCD assembly. This reflective surface returns light to the LCD assembly while preserving the polarization orientation of the light incident on the reflective surface.

It is common to substitute a backlight assembly for the reflective surface in applications where the intensity of the ambient light is insufficient for viewing. The typical backlight assembly includes an optical cavity and a lamp or other device that generates light. The backlight is powered by a battery in the case of a portable display device such as a laptop computer. Displays intended to be viewed under both ambient lit and backlit conditions are called "transflective". One problem with transflective displays is that the typical backlight is not as efficient a reflector as the traditional brushed aluminum surface. Also the backlight randomizes the polarization of the light and further reduces the amount of light available to illuminate the LCD. Consequently, the addition of the backlight to the LCD assembly makes the display less bright when viewed under ambient light.

A passive transflector may be placed between the LCD and the backlight in a transflective display to improve the brightness of the display under both ambient lit and backlit conditions. A passive transflector is an optical device which in a single state operates both as a transmitter and a reflector. Unfortunately, passive transflectors tend to be inefficient in both cases, typically transmitting only 30% of the light from a backlight and reflecting 60% of the ambient light while absorbing the remaining 10%.

A third type of optical display incorporates a dedicated backlight which is on whenever the display is operating, regardless of the level of ambient light. Such a backlight can be a significant drain on the battery in a portable display device.

SUMMARY OF THE INVENTION

The present invention provides a device comprising a switchable optical panel comprising a transparent optically active layer having a first and a second major surface, a first reflective polarizer disposed on the first major surface, and a second reflective polarizer disposed on the second major surface. The device also comprises means for switching the panel between a reflecting state and a transmitting state.

In one embodiment, the optically active layer comprises a liquid crystal device having a pair of transparent substrates in parallel register and defining a cavity between them. Each of the substrates has an inner surface facing the cavity and an outer surface. The liquid crystal device also includes a conductive material on the inner surface of each substrate and a liquid crystal material confined in the cavity. In this embodiment, the switching means is a system of driving electronics connected to the conductive material for applying voltage across the liquid crystal device. The conductive material may comprise a matrix of thin film addressable electrodes on the inner surface of each substrate to form a pixellated liquid crystal device, or a continuous transparent conductive layer on the inner surface of each substrate. The liquid crystal device is preferably a twisted nematic liquid crystal device.

The first and second reflective polarizers preferably each comprise a multilayered stack of pairs of adjacent material layers, each of the layer pairs exhibiting a refractive index difference between the adjacent layers in a first direction in the plane of the polarizer and exhibiting essentially no refractive index difference between adjacent layers in a second direction in the plane of the polarizer and orthogonal to the first direction.

Most preferably, the device comprises a switchable optical panel which includes a twisted nematic liquid crystal device comprising first and second transparent planar substrates in parallel register defining a cavity therebetween, each substrate having an outer surface and an inner surface, and a liquid crystal material confined in the cavity. The liquid crystal device further includes continuous transparent conductive layers on the inner surfaces of the substrates, a first reflective polarizer disposed on the outer surface of the first substrate and a second reflective polarizer disposed on the outer surface of the second substrate. The first and second reflective polarizers each comprise a stack of at least 100 layer pairs, wherein each layer pair comprises a birefringent layer adjacent another polymer layer, which may be isotropic or birefringent. The device also includes a system of driving electronics connected to the conductive layers, so that the panel is electronically switchable between a reflecting state and a transmitting state.

Alternatively, the device may comprise a switchable optical panel which comprises a liquid crystal device including a pair of reflective polarizers in parallel register defining a cavity therebetween, the reflective polarizers each having an inner surface facing the cavity and an outer surface. The liquid crystal device further includes a liquid crystal material confined in the cavity and transparent conductive layers on the inner surfaces of the reflective polarizers. The device further includes a system of driving electronics connected to the conductive layers, so that the panel is electronically switchable between a reflecting state and a transmitting state.

The invention further provides a switchable window comprising the switchable optical panel described previously and means for applying an electrical field to the switchable optical panel to switch the panel between an open state and a closed state. Each of the reflective polarizers in the switchable optical panel is preferably a multilayered sheet as described previously. The window may also include at least one transparent pane positioned adjacent and parallel to the switchable optical panel.

The window may be arranged in a "normally open" or "normally closed" configuration. In a normally open configuration, the window is transmissive in the absence of an electrical field while in a normally closed configuration, the window is non-transmissive in the absence of an electrical field.

The invention further provides a window which is mechanically switchable between an open and a closed state. The window comprises a first transparent pane having first and second major surfaces, a first reflective polarizer disposed on the first transparent pane, and at least one shutter which includes a second transparent pane, a second reflective polarizer disposed on the second transparent pane, and an optically active layer disposed on a side of the second transparent pane opposite the second reflective polarizer. The window also includes means for rotating the shutter to position either the optically active layer or the second reflective polarizer adjacent and parallel to the first reflective polarizer.

The switchable window of this invention permits electronic or mechanical control of window transmission for purposes of privacy, light control and energy control in buildings, houses, and automobiles. The window does not absorb significant amounts of outdoor light, thereby avoiding the excessive window heating characteristic of optically absorptive windows.

The invention further provides a transflective optical display which includes a liquid crystal display device comprising a front absorptive polarizer, a rear absorptive polarizer and a pixellated liquid crystal device located therebetween, a backlight positioned proximate to the liquid crystal display device for illuminating the liquid crystal display device, an optical diffuser located between the liquid crystal display device and the backlight, and a switchable transflector located between the optical diffuser and the backlight. The switchable transflector includes a non-pixellated liquid crystal device having a front surface located adjacent to the rear absorptive polarizer and a rear surface, the liquid crystal device having a front alignment direction associated with the front surface and a rear alignment direction associated with the rear surface and a reflective polarizer disposed on the rear surface of the non-pixellated liquid crystal device and proximate to the backlight. The optical display further includes means for electronically switching the transflector between a reflecting state and a transmitting state. The polarization orientation of the rear absorptive polarizer is parallel to the front alignment direction of the liquid crystal device. The reflective polarizers are preferably each a multilayered sheet as described previously.

The switchable transflector is efficient in both a transmissive and a reflective state, allowing a transflective optical display of this invention to use at least 80% of the available light for illumination of the LCD regardless of the light source. Because of the transflector's efficiency, the backlight can be turned off under normal ambient light conditions in order to increase the life of the battery.

DETAILED DESCRIPTION

A device of this invention comprises a switchable optical panel which includes a transparent optically active layer having two major surfaces, a first reflective polarizer disposed on one major surface of the optically active layer and a second reflective polarizer disposed on the other major surface. The device also includes means for switching the panel between a reflecting state and a transmitting state.

Figure 1:
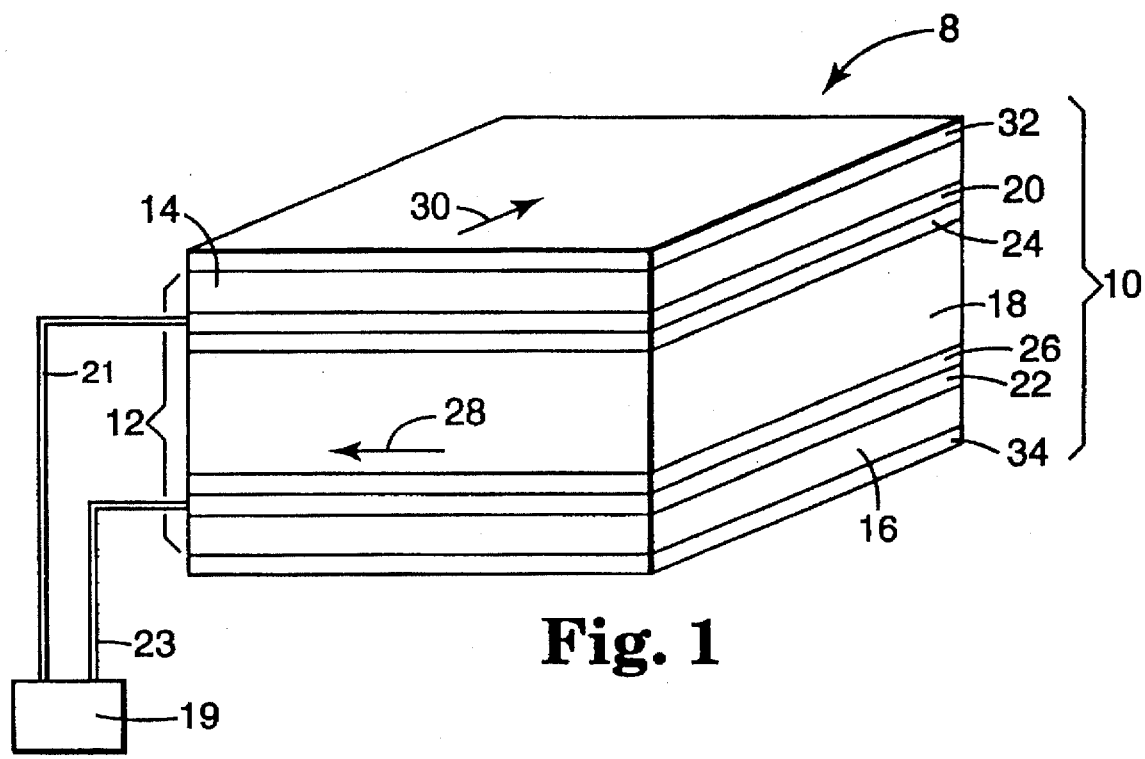
FIG. 1 is a schematic perspective view of a switchable optical device according to one embodiment to the present invention.

FIG. 1 shows a preferred embodiment of the device. Device 8 includes switchable optical panel 10, in which the optically active layer comprises a liquid crystal device 12. Liquid crystal device 12 comprises a pair of transparent planar substrates 14 and 16 in parallel register, overlying and spaced apart from one another. The periphery of the substrates are joined and sealed with an adhesive sealant (not shown) to define an enclosed cavity. The cavity is filled with liquid crystal material 18. A conductive material is provided on the inner surface of the substrates to allow voltage to be applied across the liquid crystal material. The conductive material may be in the form of continuous transparent conductive layers 20 and 22 as shown in FIG. 1, or a matrix of thin film addressable electrodes to form a pixellated liquid crystal device. A pixellated liquid crystal device is comprised of thousands of small picture elements, or "pixels", which can be made to appear black, white, or possibly gray. When used as part of a standard liquid crystal display (LCD), an image can be displayed by appropriate manipulation of the individual pixels.

Alignment layers 24 and 26 disposed on the inner surfaces of the transparent conductive layers cause a desired orientation of the liquid crystal material 18 at its interface with each substrate. Arrows 28 and 30 show how the molecules of the liquid crystal material are aligned in approximately a 90° twist by the alignment layers 24 and 26 in the absence of an electrical field. The liquid crystal device is preferably a twisted nematic (TN) liquid crystal device having an angle of rotation of between 0° and 90°, more preferably between 80° and 90°. Alternatively, the liquid crystal device may be a super twisted nematic device (STN) having an angle of rotation between 180° and 270°. Other types of LCDs, such as ferroelectric LCDs, may also be used.

Substrates 14 and 16 may be made of glass or plastic materials which are optically transparent, have low birefringence, and have reasonable dimensional stability under the conditions encountered during the manufacture and use of the switchable optical devices. In order to maintain uniform spacing between the substrates, one of several known spacing methods must be employed. For example, beads or fibers may be incorporated into the cavity between the substrates, or at least one substrate may be molded to form integral spacing ribs as described in U.S. Pat. No. 5,268,782.

Referring again to FIG. 1, reflective polarizers 32 and 34 are disposed on the outer surfaces of substrates 14 and 16, respectively. In general, a reflective polarizer of this invention has the effect of separating randomly polarized light into its plane-polarized components. Randomly polarized light can be viewed as the sum of two orthogonal plane-polarized components of equal magnitude having polarization states (a) and (b). Under optimum conditions, the reflective polarizer transmits all of the light having polarization state (a) which is orthogonal to the stretch direction of the polarizer, and reflects light having polarization state (b). The polarization orientation of reflective polarizer 32 may be oriented parallel (e-mode) or orthogonal (o-mode) to the alignment direction of liquid crystal 12 as shown by arrow 30. The polarization orientations of reflective polarizers 32 and 34 may be orthogonal to one another (crossed) or parallel.

Device 8 preferably includes a birefringent compensation film (not shown), such as an optical retarder, e.g., a negative birefringent optical retarder. The birefringent compensation film is provided between substrate 14 and reflective polarizer 32 and/or between substrate 16 and reflective polarizer 34. Such films allow device 8 to maintain desirable optical characteristics over the visible wavelength range and at off-normal angles.

Figure 2:
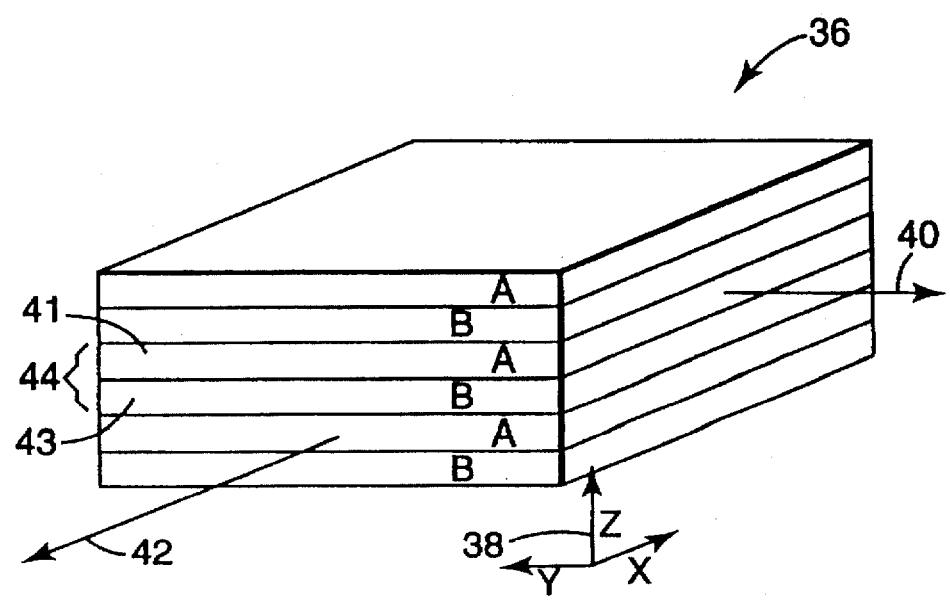
FIG. 2 is a schematic perspective view of a portion of a reflective polarizer for use with the present invention.

FIG. 2 is a schematic perspective diagram of a segment of a preferred reflective polarizer 36. The figure includes a coordinate system 38 that defines x, y and z directions. Reflective polarizer 36 is a multilayered stack of alternating layers of two different materials. The two materials are referred to as material "A" and material "B" in the drawing and description. Adjacent layers 41 and 43 of material A and material B comprise an exemplary layer pair 44. Layer pair 44 exhibits a refractive index difference between adjacent layers 41 and 43 associated with the x direction, and essentially no refractive index difference between layers 41 and 43 associated with the y direction.

In a preferred embodiment of the device of this invention, the first and second reflective polarizers each comprise a multilayered sheet of alternating layers of materials A and B in which each of the layers has an average thickness of not more than 0.5 μm. A layer of material A adjacent to a layer of material B comprises a layer pair. The number of layer pairs is preferably in the range from about 10 to 2000, and more preferably about 200 to 1000.

The multilayered sheet is formed by coextrusion of materials A and B into a sheet, followed by uniaxial stretching in the x direction. The stretch ratio is defined as the dimension after stretch divided by the dimension before stretch. The stretch ratio is preferably in the range from 2:1 to 10:1, more preferably 3:1 to 8:1, and most preferably 4:1 to 7:1, e.g., 6:1. The sheet is not appreciably stretched in the y direction. Material A is a polymeric material chosen to exhibit a stress-induced birefringence, or change in index of refraction with stretching. For example, a uniaxially stretched sheet of material A will have one index of refraction, $n_{Ax}$, associated with the stretch direction ($n_{Ax}=1.88$, for example) and a different index of refraction, $n_{Ay}$, is associated with the transverse direction ($n_{Ay}=1.64$, for example). Material A exhibits a difference in index of refraction between the stretch and transverse directions ($n_{Ax}-n_{Ay}$) of at least 0.05, preferably at least 0.10, and more preferably at least 0.20. Material B is a polymeric material chosen such that its refractive index, $n_{By}$, is substantially equal to $n_{Ay}$ after the multilayer film is stretched. Upon stretching, the value of $n_{Bx}$ preferably decreases.

After stretching, the multilayered sheet of this embodiment shows a large difference in index of refraction between adjacent layers associated with the stretch direction (defined as $\Delta n_x=n_{Ax}-n_{Bx}$). In the transverse direction, however, the index of refraction difference between adjacent layers is substantially zero (defined as $\Delta n_y=n_{Ay}-n_{By}$). These optical characteristics cause the multilayered stack to act as a reflective polarizer that will transmit the polarization component of randomly polarized light that is parallel to transmission axis 40 shown in FIG. 2. The portion of light which is transmitted by reflective polarizer 36 is referred to as having polarization state (a). The portion of light which does not pass through reflective polarizer 36 has polarization state (b) which corresponds to extinction axis 42 shown in FIG. 2. Extinction axis 42 is parallel to the stretch direction x. Therefore, (b)-polarized light encounters the index of refraction difference $\Delta n_x$, which results in its reflection. The reflective polarizer is preferably at least 50% reflective of (b)-polarized light and more preferably at least 90%. The third refractive index differential, $\Delta n_z$, is important for controlling the off-axis reflectivity of the reflective polarizer. For high extinction ratios of the (b)-polarized, and for high transmission of (a)-polarized light, at large angles of incidence, it is preferred that $\Delta n_z=n_{Az}-n_{Bz}<0.5\ \Delta n_x$, more preferably less than $0.2\ \Delta n_x$, and most preferably less than $0.1\ \Delta n_x$.

The optical behavior and design of such reflective polarizers is described in more detail in Assignee's copending application, U.S. Ser. No 08/402041, filed Mar. 10, 1995, entitled "Optical Film."

One of ordinary skill will be able to select materials appropriate to achieve the desired refractive index relationships. In general, Material A may be selected from a semi-crystalline polymeric material, such as a semi-crystalline naphthalene dicarboxylic acid polyester or polyethylene naphthalate (PEN) and isomers thereof (e.g., 2,6-, 1,4-, 1,5-, 2,7-, and 2,3-PEN). Material A may also be selected from other semi-crystalline polymer materials, such as polyethylene terephthalate (PET), polyethylene isophthalate (PEI), and copolymers of PEN, PET, and PEI. As used herein, coPEN includes copolymers of PEN and coPET includes copolymers of PET. Material B may be a semi-crystalline or amorphous polymeric material, such as syndiotactic polystyrene (sPS), and copolymers, e.g., coPEN, coPET, and copolymers of polycyclohexanedimethylene terephthalate, commercially available from Eastman Chemical Co. under the trade designation Eastar. The coPEN described may also be a blend of pellets where at least one component is a polymer based on naphthalene dicarboxylic acid and other components are other polyesters or polycarbonates, such as a PET, a PEN or a coPEN. Materials A and B are preferably chosen to have similar theological properties (e.g., melt viscosities) such that they can be coextruded.

The reflective polarizer is prepared by coextruding material A and material B to form a multilayered film and then orienting the film by stretching substantially in one direction (uniaxially) at a selected temperature, optionally followed by heat-setting at a selected temperature. The film may be allowed to dimensionally relax in the cross-stretch direction (orthogonal to the stretch direction) in the range from the natural reduction in cross-stretch dimension (equal to the square root of the stretch ratio) to no reduction in cross-stretch dimension (corresponding to complete constraint). The film may be stretched in the machine direction, as with a length orienter, or in the width direction, as with a tenter.

It will be apparent to one of ordinary skill to select a combination of process variables such as stretch temperature, stretch ratio, heat set temperature and cross-stretch relaxation, to yield a reflective polarizer having the desired refractive index relationship.

In a particularly preferred embodiment, the multilayered sheet comprises a stack of layer pairs of materials A and B as described above, in which the stack is divided into one or more segments of layer pairs. Each segment is designed to have maximum reflectivity of light having a bandwidth by having layer pairs each with a combined thickness of about one half of the wavelength in the center of the bandwidth for that segment. The combination of segments having different layer pair thicknesses allows the reflective polarizer to reflect light having a relatively large bandwidth.

For example, the multilayered sheet may include ten segments having layer pairs with a combined thickness ranging from 100 nm to 200 nm. Each segment may include between 10 and 50 layer pairs. This polarizer is capable of reflecting light having wavelengths in the range from 400 to 800 nm. Alternatively, the thicknesses of the layered pairs may be continuously graded from 100 to 200 nm. For optical coverage of wavelengths between 400 and 2000 nm, the pair thicknesses should range from about 100–500 nm.

Although the multilayer optical film described above is preferred for the reflective polarizers, other reflective polarizers may be used, such as microstructured MacNeille polarizers and cholesteric polarizers having a quarter-wave plate attached thereto.

The reflective polarizers may be laminated to the LCD or adhered to the LCD at the edges of the LCD, or they can be mechanically secured to the LCD.

Referring again to FIG. 1, an electrical field can be applied to the liquid crystal material 18 via conductive layers 20 and 22 using a system of driving electronics such as electrical source 19 via leads 21 and 23. When the field is applied, the liquid crystal molecules over the entire area re-orient and "untwist" due to the dielectric anisotropy of the molecules. This behavior allows the molecules to rotate polarized light by 90° when in the twisted state and transmit light without rotation when in the untwisted state. When used in combination with reflective polarizers 32 and 34, this ability to rotate polarized light provides a means for switching switchable optical panel 10 between a reflecting state and a transmitting state.

For pairs of identical reflecting polarizers, the reflectivity of the optical panel will be approximately doubled when switched from the transmitting state to the reflecting state (ignoring front and back surface reflections of the polymers and the conductive material). This value of the reflection ratio changes very little with the quality of the reflecting polarizer. However, the transmission ratio of the transmitting and reflecting states depends strongly on the extinction value of the two polarizers. For very leaky polarizers, say 50% extinction of the high extinction polarization (perfect extinction being 100%), the transmission of the panel in the transmitting state will be 75%, and for the reflecting state, 50%. The transmission ratio for this "leaky" optical panel is only 1.5. Optical panels having a transmission ratio of 1.5, while not very useful as privacy shutters, could still provide significant energy control on exterior windows of buildings or cars. For good polarizers with 99.9% extinction, the transmission in the closed state will be only 0.1%, while in the transmitting state it will be roughly 50% transmissive, yielding a transmission ratio of 500.

The extinction value of a given polarizer depends on the optical bandwidth of interest to the user. For laser applications, narrow bandwidths are sufficient. Privacy window bandwidths must cover at least all of the visible spectrum, while solar energy control windows desirably cover both the visible and near infrared portions of the spectrum (400–1200 nm). The multilayer film reflecting polarizer described above is capable of covering any of the above bandwidths.

Figure 3:
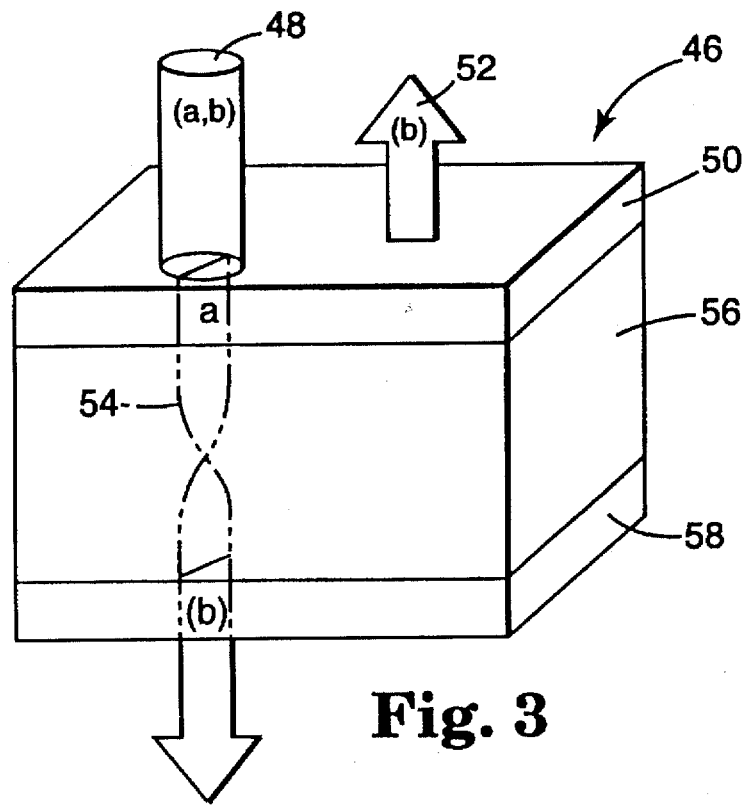
FIG. 3 is a schematic perspective view of a switchable optical panel according to one embodiment of the present invention.

To illustrate the switching concept, FIG. 3 shows a schematic perspective diagram of a switchable optical panel 46 in which a ray 48 of randomly polarized light containing both polarization states (a) and (b) strikes reflective polarizer 50. Of the light contained in ray 48, light having polarization state (b) (represented by ray 52) is reflected, while light having polarization state (a) (represented by ray 54) is transmitted by reflective polarizer 50. In the absence of an electrical field, liquid crystal 56 causes the polarization state of ray 54 to be rotated about 90°, after which it is transmitted by reflective polarizer 58 (which is crossed with respect to reflective polarizer 50). Thus, switchable optical panel having crossed reflective polarizers 50 and 58 is substantially transmissive. This is referred to as a "normally open" state. Under optimum conditions, the optically switchable film is 50% transmissive. Due to residual absorption, incomplete rotation of polarization, front and back reflections, and reflection from the conductive layers (not shown), the transmission is generally in the range from about 25 to 40%.

Figure 4:
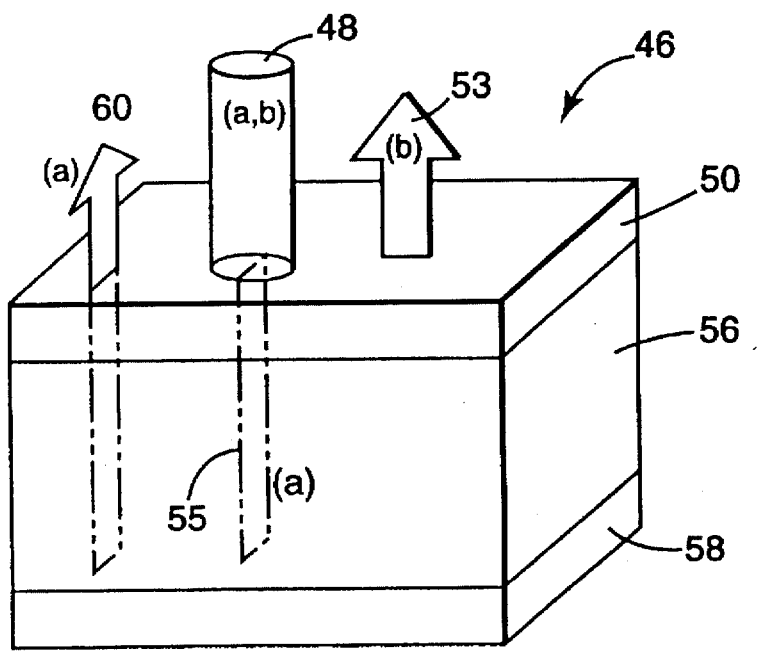
FIG. 4 is a schematic perspective view of the panel of FIG. 3 after an electric field has been applied.

When an electrical field is applied to switchable optical panel 46 as shown in FIG. 4, ray 48 is once again divided by reflective polarizer 50 into a transmitted ray (shown as ray 55) and reflected ray 53. In this situation, however, ray 55 passes through liquid crystal 56 unrotated, and is reflected by reflective polarizer 58. The reflected light, shown as ray 60, passes again through liquid crystal 56 unrotated and finally is transmitted by reflective polarizer 50. Thus, switchable optical panel 46 is almost fully reflective in this state. Absorptive losses in the conductive layers and in the reflective polarizers are small, e.g., ≈1–5%.

It will be understood that the optical behavior of switchable optical panel 46 can be transposed (i.e., the panel becomes transmissive when an electrical field is applied and reflective in the absence of an electrical field) by positioning reflective polarizers 50 and 58 in parallel with respect to one another rather than crossed. This is referred to as a "normally closed" state.

Alternatively, it may be desirable to have the reflectivity of the switchable optical panel be adjustable along a gray scale. Such adjustability is achievable by using a twisted nematic liquid crystal device and varying the voltage applied to adjust the intensity of the transmitted light. This approach may be difficult, however, because a uniform gray scale requires precisely uniform spacing of the substrates and uniform alignment of the liquid crystal molecules across a large area, as well as uniform temperature and electrical field. Slight variations in these conditions will cause variations in reflectivity across the display, creating a mottled appearance. Alternatively, an effective gray scale can be implemented by using a pixellated liquid crystal and switching only a certain fraction of the pixels to give the appearance of grayness (from a distance) to a human viewer.

In an alternative embodiment, the switchable optical panel comprises a pair of reflective polarizers such as those described previously, positioned in parallel register and spaced apart from one another to form an enclosed cavity in which a liquid crystal material is confined. The reflective polarizers thereby act in place of the substrates of the liquid crystal described previously. This embodiment will be understood to include the conductive layers, alignment layers, diffusion barriers and any other suitable elements associated with the substrates of the previous embodiment.

Other embodiments of this invention may include various birefringent materials in the optically active layer other than the liquid crystal device previously described, including uniaxially oriented birefringent thermoplastics and switchable polymer-dispersed liquid crystal devices such as those disclosed in U.S. Pat. No. 4,435,047. The means for switching the film from a reflecting to a transmitting state is chosen based on the characteristics of the birefringent material and the application in which the film is to be used. For instance, the means for switching may include stretching the optically active layer to alter its birefringence, or removing the optically active layer from between the reflective polarizers to prevent the rotation of plane-polarized light.

Figure 5:
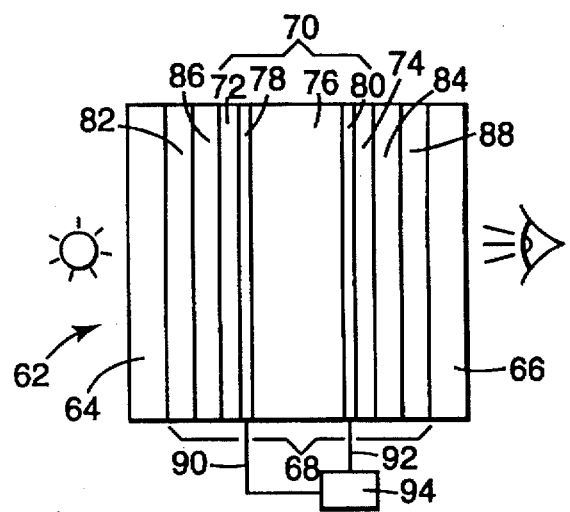
FIG. 5 is a schematic side view of a switchable window according to one embodiment of the present invention.

FIG. 5 is a schematic diagram of a switchable window 62 of this invention. Window 62 comprises a pair of transparent panes 64 and 66 and an switchable optical panel 68 positioned between the panes. Switchable optical panel 68, as previously described, preferably comprises a liquid crystal device 70 comprising a pair of transparent planar substrates 72 and 74 in parallel register, a liquid crystal material 76 confined in the cavity between the substrates, and conductive layers 78 and 80 disposed on the inner surfaces of substrates 72 and 74. Reflective polarizers 82 and 84 are disposed on the outer surfaces of substrates 72 and 74, respectively, and may be crossed or parallel with respect to one another. For the purpose of subsequent discussion, reflective polarizers 82 and 84 are considered to be parallel. Absorptive polarizers 86 and 88 are preferably placed on the surfaces of reflective polarizers 82 and 84, as shown in FIG. 5, with the polarization orientation of each absorptive polarizer parallel to the transmission polarization orientation of the reflective polarizer on which it is placed. Conductive layers 78 and 80 are connected to an electrical source 94 by means of leads 90 and 92, or other like means.

Transparent panes 64 and 66 may be made of glass or other transparent, rigid, weather-stable materials suitable for use in windows. Reflective polarizers 82 and 84 preferably each comprise a multilayered stack of alternating polymeric material layers as discussed previously and shown in FIG. 2. Absorptive polarizers 86 and 88 may be any of several types which are well known in the art, such as dichroic polarizers based on iodine or dye-stained oriented polyvinyl-alcohol. Alternatively, the absorptive polarizers can be included in the skin layer of the reflective polarizer.

Figure 6A:
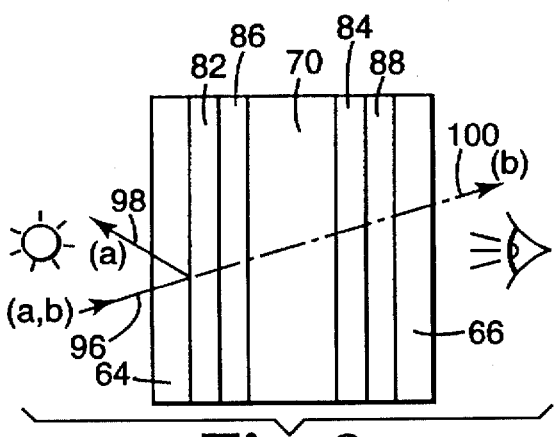
FIGS. 6a, 6b, 7a, and are side schematic views illustrating the operation of the switchable window of FIG. 5.

FIGS. 6a, 6b, 7a and 7b illustrate the operation of switchable window 62. In FIG. 6a, an electrical field is applied to the window through leads 90 and 92, causing liquid crystal material 76 to "untwist" as described previously. An exemplary ray of randomly polarized outdoor light 96, such as sunlight, containing equal amounts of polarization states (a) and (b), passes entirely through pane 64. A portion (close to 50% for a good reflective polarizer) of ray 96 which is reflected by reflective polarizer 82 is shown as ray 98 having polarization (a). The remainder of the light (having polarization (b)), shown as ray 100 passes through absorptive polarizer 86 and liquid crystal 70 without rotation, and is finally transmitted by reflective polarizer 84 and absorptive polarizer 88 for viewing indoors. Because the window is about 50% transmissive in this state, it is referred to as the "open" state.

Figure 6B:
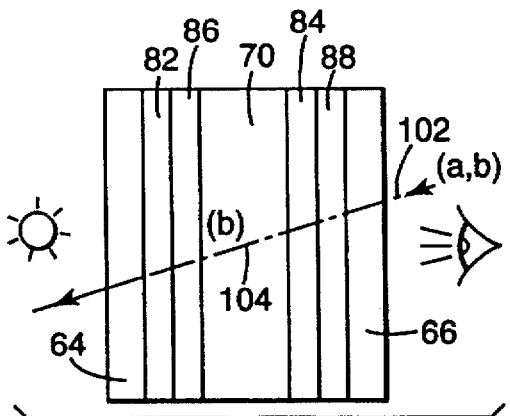

In the same state, an exemplary ray of randomly polarized indoor light 102 passes through pane 66 as shown in FIG. 6b. The component of ray 102 having (a) polarization is absorbed by absorptive polarizer 88 before reaching reflective polarizer 84. The remainder of the light, shown as ray 104, is (b)-polarized and is transmitted through the rest of the window. The absorptive polarizer 88, therefore, absorbs indoor light which would otherwise be reflected back into the room by reflective polarizer 84, thereby preventing an undesirable mirrored appearance.

Figure 7A:
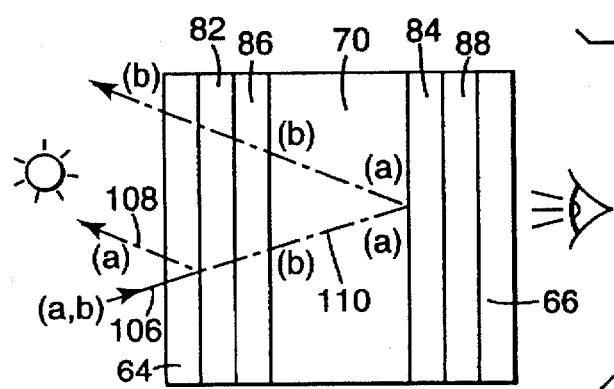
Figure 7B:
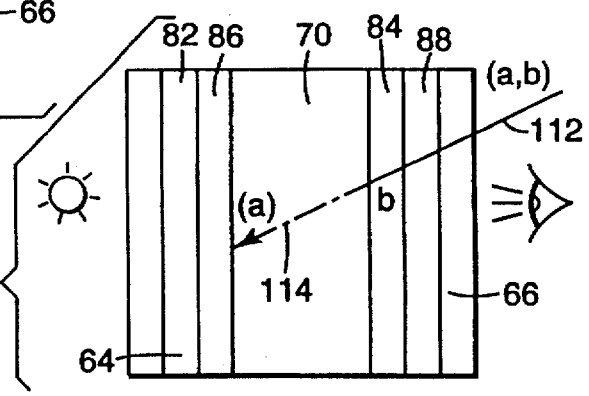

To switch window 62 to the reflective ("closed") state, the electrical field is removed so that the liquid crystal material 76 reverts to a twisted configuration. In this state, depicted in FIG. 7a, an exemplary ray 106 of outdoor light is about 50% reflected by reflective polarizer 82 as described for the "open" state. The reflected light is shown as ray 108 having (a) polarization. The remainder of the light, shown as ray 110 having (b) polarization, is transmitted by absorptive polarizer 86 but is rotated to (a) polarization by liquid crystal 70. The resulting light is reflected by reflective polarizer 84, re-rotated by liquid crystal 70 and transmitted by absorptive polarizer 86, reflective polarizer 82 and pane 64 back outdoors. Referring to FIG. 7b, the (a) polarization component of a ray 112 of indoor light is absorbed by absorptive polarizer 88, while the (b) polarization component (shown as ray 114) is absorbed by absorptive polarizer 86. A window 62 in the "closed" state therefore appears mirror-like to a viewer outdoors in daylight, and dark to a viewer indoors.

Figure 8:
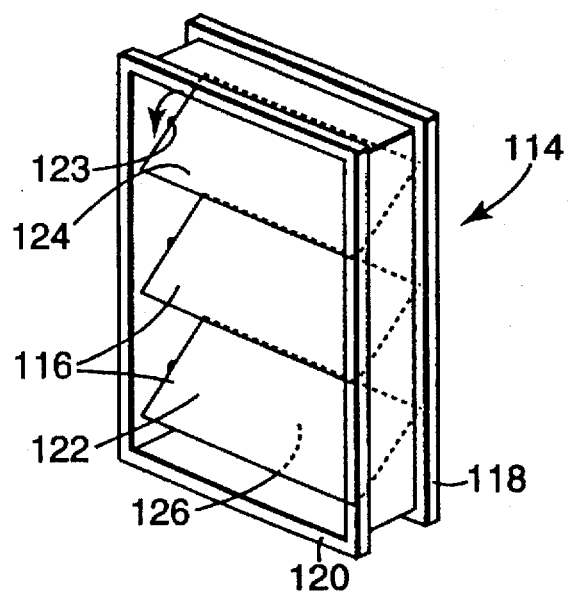
FIG. 8 is a schematic perspective view of a switchable window according to one embodiment of the present invention.

In another embodiment, switchable window 114 is depicted in FIG. 8. The window includes a shutter 116, a transparent pane 118 and a reflective polarizer 120. Shutter 116 includes a transparent pane 122 with a birefringent layer 124 on one side and a reflective polarizer 126 on the other side. Birefringent layer 124 is preferably a polymeric sheet, such as PET. For highest transmission, the sheet is an achromatic ½ wavelength retarder or an LCD. In any event, layer 124 should be oriented for maximum transmission. Reflective polarizers 120 and 126 are crossed.

Shutter 116 is rotatably mounted about pivot point 123, for example to a window frame, so that the shutter can be positioned in an "open" position or a "closed" position. Suitable means for rotation include manual or motorized motion, e.g., for venetian blinds. Three identical shutters are shown in FIG. 8 which are mounted a distance apart so that they may freely rotate, but are able to form a continuous panel when mechanically closed. The switchable window of this invention may include only one shutter, or a plurality of shutters. Transparent pane 118, having reflective polarizer 120 on one surface, is maintained in a fixed position.

In one example of an "open" position, the shutter is rotated so that birefringent layer 124 is adjacent and parallel to reflective polarizer 120. In this position, the birefringent layer 124 lies between reflective polarizers 120 and 126. Randomly polarized light rays striking window 114 are therefore partially transmitted and partially reflected due to the rotation of plane-polarized light by birefringent layer 124, in the same manner as described for the previous embodiment of the switchable window. In a corresponding "closed" position, shutter 116 is rotated so that reflective polarizer 120 is adjacent and parallel to reflective polarizer 126, and birefringent layer 124 is facing away from reflective polarizer 120. In this position, birefringent layer 124 is not in a position to affect the rotation of plane-polarized light transmitted by reflective polarizers 120 and 126. Because reflective polarizers 120 and 126 are crossed, plane-polarized light transmitted by one reflective polarizer is reflected by the other reflective polarizer, leading to a substantially reflective window when viewed either from the outside or the inside.

Optionally, at least one absorptive polarizer may be placed on the inside (viewer side) of reflective polarizer 120, or between reflective polarizer 126 and pane 122, or both. The polarization orientation of the absorptive polarizer is parallel to the polarization orientation of the reflective polarizer adjacent to it. The absorptive polar provides anti-reflective properties as described in the previous embodiment.

A particular feature of this embodiment is that whether the window is in an "open" or "closed" state, the shutters are always physically closed to form a continuous panel. This feature gives the window good transmission from any angle of view, and provides better thermal insulation than if the shutters were physically open.

Figure 9:
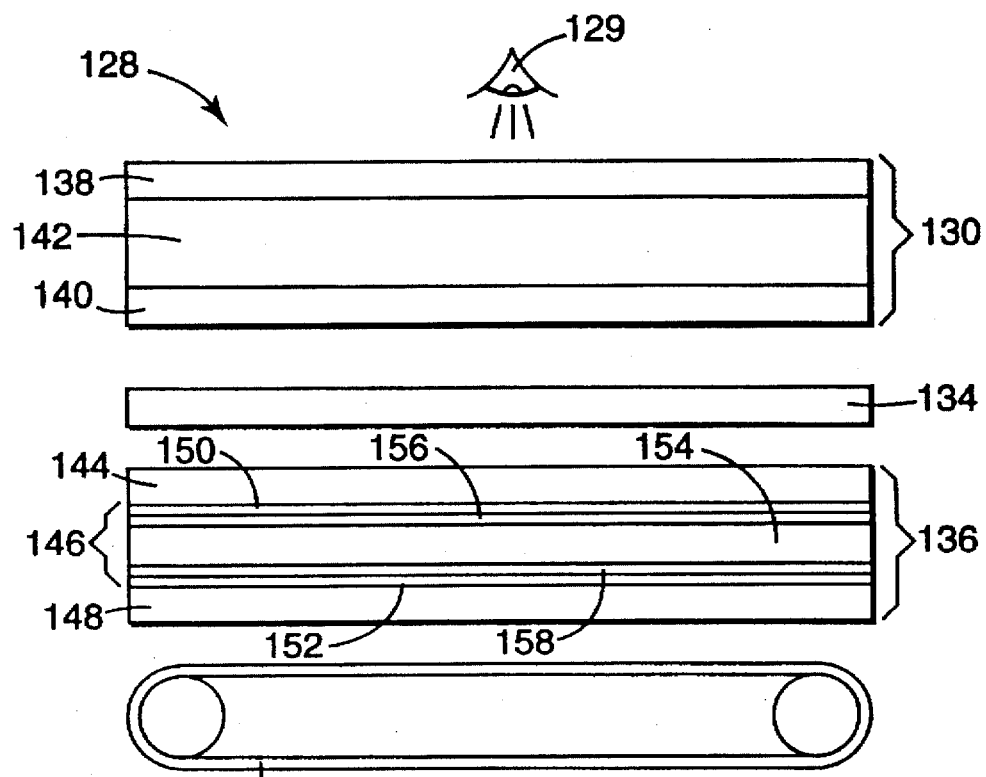
FIG. 9 is a schematic side view of a transflective optical display according to one embodiment of the present invention.

FIG. 9 is a schematic diagram of a transflective optical display 128 including a liquid crystal display (LCD) device 130, a backlight 132, an optical diffuser 134, and a switchable transflector 136. Typically the complete transflective optical display 128 will be planar and rectangular in plan view as seen by observer 129 and will be relatively thin in cross section with the components in close proximity to each other. The optical display 128 also includes electronic means (not shown) for switching transflector 136 between a reflecting state and a transmitting state, such as an electrical source and leads as described previously.

LCD device 130 is a well known construction, including a front absorptive polar 138, a rear absorptive polarizer 140 and a pixellated liquid crystal panel 142. The LCD device is designed to display information and images by means of pixel areas which can be switched on or off by a matrix of addressing electrodes in a manner which is well known in the art.

The backlight 132 may be an electroluminescent panel, a cold cathode fluorescent lamp in a reflective housing, or coupled to a light guide. The backlight should have low absorbence and be diffuse.

The optical diffuser 134 promotes viewing of the LCD at a wide range of viewing angles. The optical diffuser 134 is typically a sheet of a polarization preserving material such as transparent spherical particles in a non-birefringent base film. If the diffuser does not preserve polarization, more light will be absorbed by dichroic polarizer 140.

Switchable transflector 136 includes an optional reflective polarizer 144, a non-pixellated liquid crystal device 146 and a reflective polarizer 148. The polarization orientation of reflective polarizer 144 (if used) must be parallel to the polarization orientation of absorptive polarizer 140. The liquid crystal device comprises a front substrate 150 and a rear substrate 152 enclosing liquid crystal material 154. The non-pixellated liquid crystal device also includes continuous transparent conductive layers 156 and 158 which enable the entire area of switchable transflector 136 to be electronically switched between a reflecting and a transmitting state in the manner described previously. The liquid crystal device 146 also includes alignment layers (not shown) which provide a front alignment direction associated with the front substrate and a rear alignment direction associated with the rear substrate.

Reflective polarizers 144 and 148 are preferably each a multilayered stack of alternating layers of two different materials, as was described with reference to FIG. 2. Most preferably, reflective polarizers 144 and 148 each comprise a stack of alternating layers of PEN and coPEN in the configuration described previously.

In general, switchable transflector 136 is intended to be transmissive when LCD device 130 is illuminated by backlight 132. When backlight 132 is shut off and LCD device 130 is viewed in ambient light, switchable transflector 136 becomes reflective so as to increase the brightness and contrast of the display. The operation of transflective optical display 128 is illustrated in FIGS. 10 and 11.

Figure 10:
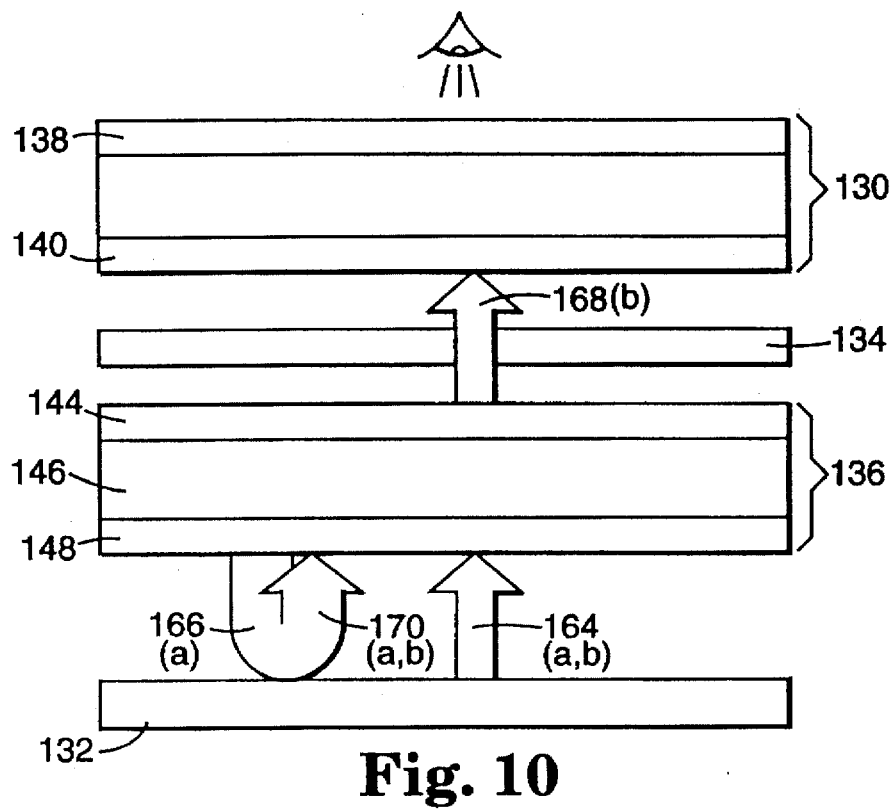
FIGS. 10 and 11 are schematic side views illustrating the operation of the transflective optical display of FIG. 9.

In a preferred backlit mode of transflective optical display 128, shown in FIG. 10, an electrical field is applied to transflector 136 and reflective polarizers 144 and 148 are parallel. Exemplary ray 164 of randomly polarized light containing polarization states (a) and (b) is produced by backlight 132. The portion of ray 164 having (b) polarization is transmitted without rotation by switchable transflector 136, since an electrical field applied to the switchable transflector "untwists" the liquid crystal material inside it and the polarization orientations of reflective polarizers 144 and 148 are parallel. The transmitted light, shown as ray 168, passes through diffuser 134 and has the correct polarization to be transmitted by absorptive polarizer 140. Meanwhile, the portion of ray 164 having (a) polarization, shown as ray 166, is reflected by reflective polarizer 148 and returned to the backlight where it is scattered and depolarized. This light will re-emerge from backlight 132 as ray 170, which will be partially transmitted and partially reflected by switchable transflector 136. With repeated reflections and depolarizations in this manner, a large percentage of the light from backlight 132 eventually is "recycled" and passes through switchable transflector 136 with the correct polarization.

It should be noted that reflective polarizer 144 is not required in switchable transflector 136 if liquid crystal panel 146 is completely optically inactive in the powered state (i.e., all light transmitted by reflective polarizer 148 is not rotated). If, however, liquid crystal panel 146 remains somewhat birefringent when an electrical field is applied to it, then in general some components of visible light transmitted by switchable transflector 136 will have an incorrect polarization with respect to absorptive polarizer 140. In that case, reflective polarizer 144 is needed to reorient those components through the above-described recycling process so they are not absorbed by absorptive polarizer 140.

Figure 11:
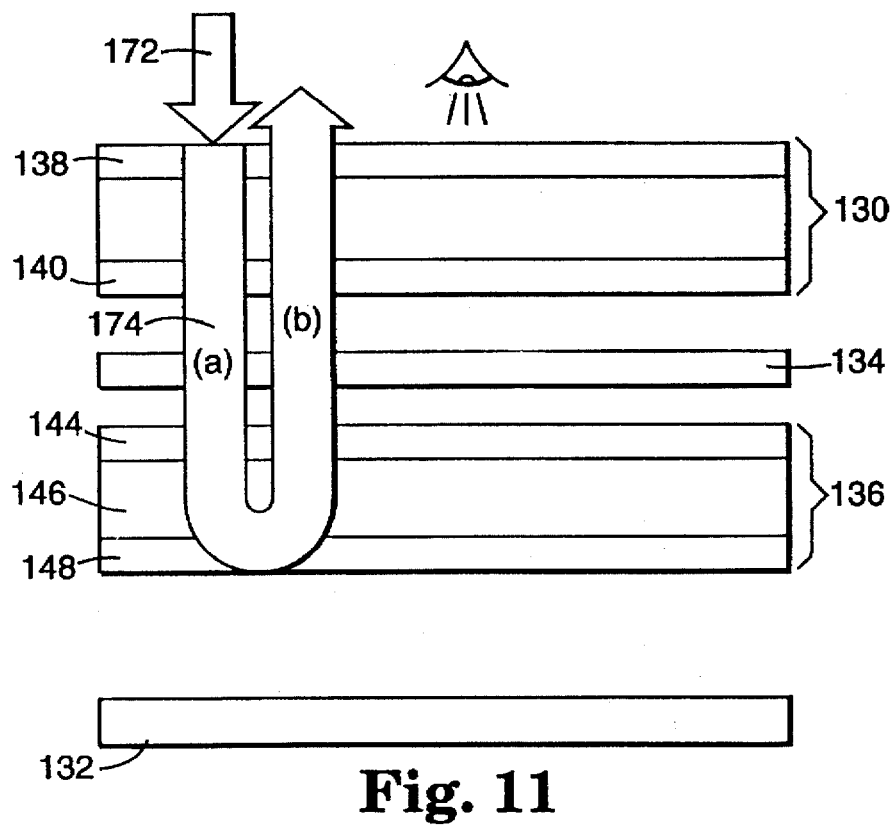

In an ambient lit mode of the same transflective optical display, shown in FIG. 11, backlight 132 is off and no electrical field is applied to switchable transflector 136. Switchable transflector 136 is therefore in a reflective state as described previously with reference to FIG. 4. Exemplary ray 172 of randomly polarized ambient light is partially transmitted and partially absorbed by absorptive polar 138. If ray 172 strikes a clear pixel of LCD 130, the portion of light transmitted by absorptive polarizer 138 (shown as ray 174 having polarization state (b)) will also be transmitted by absorptive polarizer 140. Ray 174 continues through diffuser 134 and is reflected by switchable transflector 136, returning to absorptive polarizer 140 in the same polarization state in which it left. Ray 174 is transmitted back through LCD 130, creating a bright pixel to a viewer's eye. If ray 172 were to strike a black pixel instead (not shown), ray 174 would be absorbed by absorptive polarizer 140.

In this mode, diffuser 134 is needed to make pixels appear bright from various angles of view. As in the backlit mode, if liquid crystal panel 146 rotates most of the light correctly, reflective polarizer 144 may be eliminated. Parallax between reflective polarizer 144 and absorptive polarizer 140 can cause significant loss of brightness due to absorption of light in nearby black pixels, so it is important to make diffuser 134 and liquid crystal panel 146 as thin as possible. Accordingly, it may be advantageous to eliminate reflective polarizer 144 in order to place reflective polarizer 148 closer to absorptive polarizer 140.

In a preferred embodiment, the switchable transflector comprises a pair of reflective polarizers which act as substrates to confine a liquid crystal material. This construction provides the least possible distance between reflective polarizer 148 and absorptive polarizer 140.

The transflective optical display of this invention may also be designed in a configuration in which reflective polarizers 144 and 148 are crossed, or in which absorptive polarizer 140 and reflective polarizer 148 are crossed, if reflective polarizer 144 is not used. In this case, the switchable transflector is unpowered in the backlit mode and powered in the ambient lit mode.

In the optical display of FIG. 9, the switchable transflector could be laminated or otherwise similarly adhered to or attached to the backlight and/or to the rear of the LCD device. Laminating the switchable transflector to the backlight eliminates the air gap between them and thus reduces surface reflections which would otherwise occur at the air/switchable transflector boundary. These reflections reduce the total transmission of the desired polarization.

The invention will be further illustrated by the examples which follow. All measurements are approximate.

EXAMPLE 1

A reflective polarizer for use in the present invention was constructed. The reflective polarizer comprised two 601 layer polarizers laminated together with an optical adhesive. Each of the 601 layer polarizers was produced by coextruding the web and by orienting the web two days later on a tenter. Polyethylene naphthalate (PEN) with an intrinsic viscosity of 0.5 dl/g (60 wt. % phenol/40 wt. % dichlorobenzene) was delivered by one extruder at a rate of 75 pounds (34 kg) per hour and CoPEN (70 mole %, 2,6 NDC (naphthalene dicarboxylic acid), and 30 mole % DMT (dimethyl terephthalate)) with an intrinsic viscosity of 0.55 dl/g (60 wt. % phenol/40 wt. % dichlorobenzene) was delivered by another extruder at a rate of 65 pounds (30 kg) per hour. PEN was on the skin layers, which are coextruded as thick outer layers through the same feedblock and are folded in as both internal and external layers by the multipliers. Internal and external skins comprised 8% of the total thickness of the polarizer. The feedblock method was used to generate 151 layers which was passed through two multipliers producing an extrudate of 601 layers. U.S. Pat. No. 3,565,985 describes similar coextrusion multipliers. All stretching was done in the tenter. The film was preheated to about 280° F. (140° C.) in about 20 seconds and drawn in the transverse direction to a draw ratio of about 4.4 at a rate of about 6% per second. The film was then relaxed about 2% of its maximum width in a heat-set oven set at 460° F. (240° C.). The finished film thickness was 0.0018 inch (46 µm).

Figure 12:
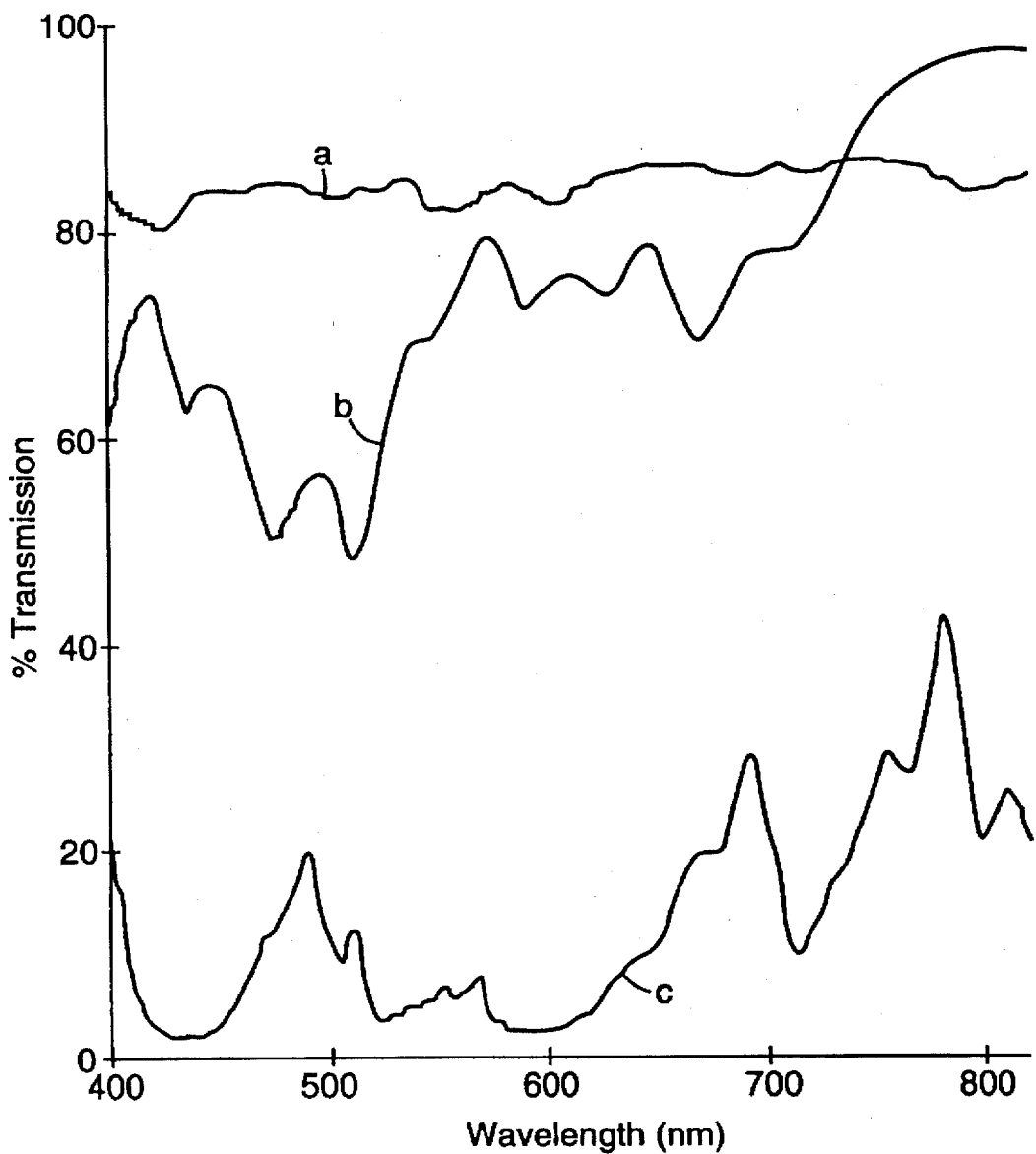
FIGS. 12–14 show the optical performance of the reflective polarizers in Examples 1–3, respectively.

The transmission of a single 601 layer film is shown in FIG. 12. Curve a shows transmission of (a)-polarized light at normal incidence, curve b shows transmission of (a)-polarized light at 60° incidence, and curve c shows transmission of (b)-polarized light at normal incidence. Note the nonuniform transmission of (a)-polarized light at both normal and 60° incidence. Also note the nonuniform extinction of (b)-polarized light in the visible range (400–700 nm) shown by curve c.

EXAMPLE 2

Another reflective polarizer for use in the present invention was constructed. The reflecting polarizer comprised 603 layers and was made on a sequential flat-film making line via a coextrusion process. Polyethylene naphthalate (PEN) with an intrinsic viscosity of 0.47 dl/g (in 60 wt % phenol plus 40 wt % dichlorobenzene) was delivered by an extruder at a rate of 83 pounds (38 kg) per hour and CoPEN was delivered by another extruder at 75 pounds (34 kg) per hour. The CoPEN was a copolymer of 70 mole %, 2,6 naphthalene dicarboxylate methyl ester, 15 mole % DMT, and 15 mole % dimethyl isophthalate with ethylene glycol. The feedblock method was used to generate 151 layers. The feedblock was designed to produce a gradient distribution of layers with a ratio of thicknesses of the optical layers of 1.22 for the PEN and 1.22 for the CoPEN. This optical stack was multiplied by two sequential multipliers. The nominal multiplication ratio of the multipliers was 1.2 and 1.4, respectively. Between the final multiplier and the die, skin layers were added composed of the same CoPEN described above, delivered by a third extruder at a total rate of 106 (48 kg) pounds per hour. The film was subsequently preheated to 300° F. (150° C.) in about 30 seconds and drawn in the transverse direction to a draw ratio of approximately 6 at an initial rate of about 20% per second. The finished film thickness was approximately 0.0035 inch (89 µm).

Figure 13:
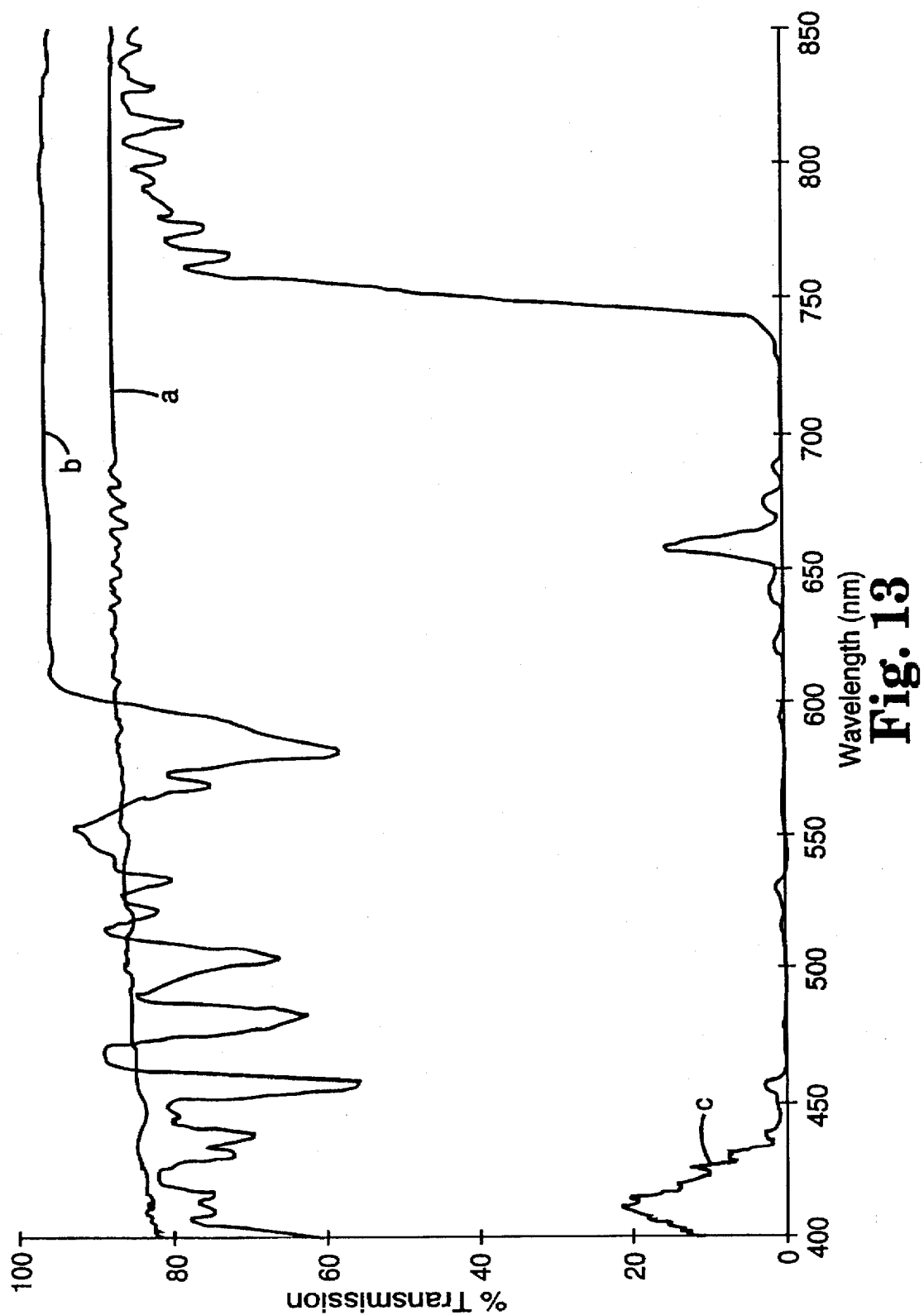

FIG. 13 shows the optical performance of this reflecting polarizer. Curve a shows transmission of light polarized in the non-stretch direction at normal incidence, curve b shows transmission of light having both plane of incidence and plane of polarization parallel to the non-stretch direction at a 50° angle of incidence, and curve c shows transmission of light polarized in the stretch direction at normal incidence. Note the very high transmission of light polarized in the non-stretch direction. Average transmission for curve a over 400–700 nm is 87%. Also note the very high extinction of light polarized in the stretched direction in the visible range (400–700 nm) shown by curve e. The film has an average transmission of 2.5% for curve e between 400 and 700 nm. The % RMS color for curve b is 5%. The % RMS color is the root mean square of the transmissivity over the wavelength range of interest.

EXAMPLE 3

Yet another reflecting polarizer for use in the present invention was constructed. The reflecting polarizer comprised a coextruded film containing 481 layers made by extruding the cast web in one operation and later orienting the film in a laboratory film-stretching apparatus. The feedblock method was used with a 61 layer feedblock and three (2×) multipliers. Thick skin layers were added between the final multiplier and the die. Polyethylene naphthlate (PEN) with an intrinsic viscosity of 0.47 dl/g (60 wt. % phenol/40 wt. % dichlorobenzene) was delivered to the feedblock by one extruder at a rate of 25.0 pounds (11.4 kg) per hour. Glycol modified polyethylene cyclohexane dimethane terephthalate (PCTG 5445 from Eastman) was delivered by another extruder at a rate of 25.0 pounds (11.4 kg) per hour. Another stream of PEN from the above extruder was added as skin layers at a rate of 25.0 pounds per hour. The cast web was 0.007 inch (0.2 mm) thick and 12 inches (30 cm) wide. The web was uniaxially oriented using a laboratory stretching device that uses a pantograph to grip a section of film and stretch it in one direction at a uniform rate while it is allowed to freely relax in the other direction. The sample of web loaded was about 5.40 cm wide (the unconstrained direction) and 7.45 cm long between the grippers of the pantograph. The web was loaded into the stretcher at about 100° C. and heated to 135° C. for 45 seconds. Stretching was then commenced at 20% per second (based on original dimensions) until the sample was stretched to about 6:1 (based on gripper-to-gripper measurements). Immediately after stretching, the sample was cooled by blowing room temperature air at it. In the center, the sample was found to relax by a factor of 2.0.

Figure 14:
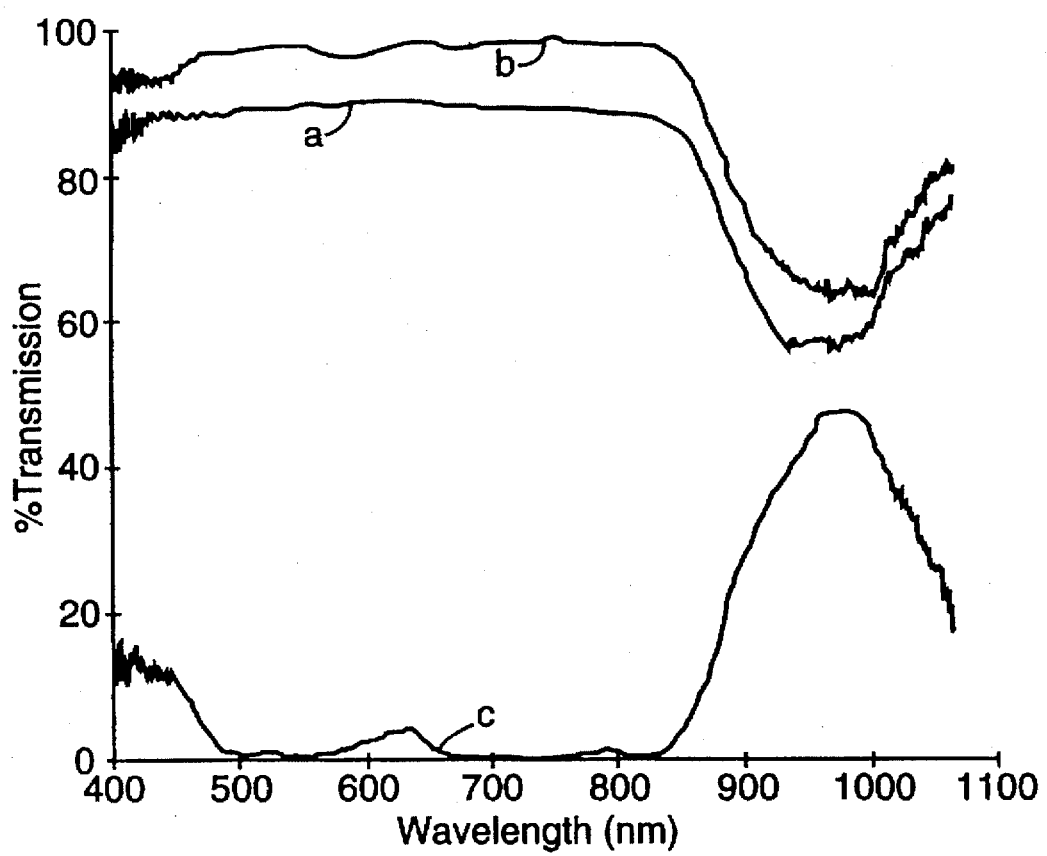

FIG. 14 shows the transmission of this multilayer film where curve a shows transmission of light polarized in the non-stretch direction at normal incidence, curve b shows transmission of light having both plane of incidence and plane of polarization parallel to the non-stretched direction at a 60° angle of incidence (p-polarized light), and curve e shows the transmission of light polarized in the stretch direction at normal incidence. Average transmission for curve a from 400–700 nm is 89.7%, average transmission for curve b from 400–700 nm is 96.9%, and average transmission for curve c from 400–700 nm is 4.0%. % RMS color for curve a is 1.05%, and % RMS color for curve b is 1.44%.

EXAMPLE 4

A switchable optical panel of this invention was prepared by attaching a reflective polarizer comprising a multilayered optical stack as described herein to either side of an STN pixellated liquid crystal display having its absorptive polarizers removed. The reflective polarizers were secured to the LCD by adhesive tape along the edges of the polarizers. The polarization orientation of each reflective polarizer was placed in parallel to the alignment direction of the liquid crystal on each substrate so that the maximum visible extinction was obtained in the reflection mode when the reflective polarizers were crossed.

The optical panel was placed in ambient light and monitored visually. With no voltage applied, the panel appeared to be partially transparent. When voltage was applied the panel switched to a mirror-like appearance.

EXAMPLE 5

A mechanically switchable window was constructed as follows: A birefringent film of ¼ wavelength at 560 nm from Polaroid Corp. was laminated to one side of a 4"×4"×¹⁄₁₆" (10×10×0.16 cm) transparent glass plate. A first reflective polarizer prepared as in Example 1 was laminated to the opposite side of the plate. A second reflective polarizer of the same construction as the first was laminated to a second transparent glass plate. The plates were held in parallel slots and were switched manually.

The switchable window was evaluated by measuring light transmission through the window both in the "closed" and the "open" position. The light source was a 12 volt tungsten-halogen lamp. The intensity of the transmitted light was measured with an amorphous silicon photodiode, which is sensitive to visible light only. In the "closed" position, the first plate was positioned parallel to the second plate with the birefringent film outward, or farthest from the second plate. To switch to the "open" position, the first plate was flipped 180° so that the birefringent film was inward, or nearest the second plate and between the two polarizers. Two control transmissions were also measured through 1) two glass plates with no polarizers or birefringent film, and 2) two reflective polarizers with polarization orientations in parallel, each laminated to a glass plate. The second control was intended to simulate the presence of a perfectly birefringent film between the polarizers. The remits are shown in the table below:

| Position | % Relative Transmission |
| --- | --- |
| 1) "closed" | 5 |
| 2) "open" | 32 |
| 3) 2 glass plates | 100 |
| 4) 2 parallel polarizers on glass | 42 |

The transmission of the two glass plates was referenced as 100%. The % relative transmissions for 1), 2), and 4) were compared to that value. The window was demonstrated to be mechanically switchable between 5 and 35% transmission. For a theoretically perfect birefringent film, as demonstrated by position 4, the transmission was 42%.

We claim:

1. A switchable optical device, comprising:
    a switchable optical panel, comprising:
        a transparent optically active layer having a first and a second major surface;
        a first reflective polarizer disposed on the first major surface of the optically active layer; and
        a second reflective polarizer disposed on the second major surface of the optically active layer; and
    means for switching the panel between a reflecting state and a transmitting state,
    wherein the first and second reflective polarizers each comprise a multilayered stack of pairs of adjacent material layers, each of the layer pairs exhibiting a refractive index difference between the adjacent layers in a first direction in the plane of the polarizer and exhibiting essentially no refractive index difference between adjacent layers in a second direction in the plane of the polarizer and orthogonal to the first direction.

2. The device of claim 1, wherein the optically active layer comprises a liquid crystal device comprising:
    a pair of transparent substrates in parallel register and defining a cavity therebetween, each of the substrates having an inner surface facing the cavity and an outer surface;
    a conductive material on the inner surface of each substrate; and
    a liquid crystal material confined in the cavity; and
    wherein the switching means comprises a system of driving electronics connected to the conductive material for applying voltage across the liquid crystal device.

3. The device of claim 2, wherein the liquid crystal device is a twisted nematic liquid crystal device.

4. The device of claim 2, wherein the liquid crystal device is a super twisted nematic liquid crystal device.

5. The device of claim 2, further comprising an optical retarder between the liquid crystal device and one of the reflective polarizers.

6. The device of claim 1, wherein the first and second reflective polarizers each comprise a multilayered sheet of alternating layers of first and second material, each layer having an average thickness of less than 0.5 µm, wherein the first material exhibits stress-induced birefringence and the sheet is uniaxially stretched.

7. The device of claim 6, wherein the first material is a semi-crystalline naphthalene dicarboxylic acid polyester.

8. The device of claim 6, wherein the multilayered sheet comprises a stack of layer pairs, the stack comprising at least one segment of layer pairs, each segment for reflecting light having a bandwidth of wavelengths, wherein each layer pair comprises a layer of the first material adjacent to a layer of the second material, wherein each layer pair has a thickness of about one half of the wavelength in the center of the bandwidth for that segment.

9. The device of claim 6, wherein the multilayered sheet comprises:
a stack of layer pairs for reflecting light having wavelengths in the range from 400 to 800 nm, wherein each layer pair comprises a layer of the first polymeric material adjacent to a layer of the second polymeric material, wherein the stack comprises layer pairs with pair thicknesses distributed to reflect light having wavelengths from 400 to 800 nm.

10. The device of claim 2, wherein the conductive material comprises a matrix of thin film addressable electrodes on the inner surface of each of the substrates to form a pixellated liquid crystal device.

11. The device of claim 2, wherein the conductive material comprises continuous transparent conductive layers on the inner surfaces of the substrates.

12. The device of claim 1, wherein the optically active layer comprises a uniaxially oriented birefringent thermoplastic.

13. A device, comprising:
a switchable optical panel, comprising:
a twisted nematic liquid crystal device comprising first and second transparent substrates in parallel register defining a cavity therebetween, each substrate having an outer surface and an inner surface facing the cavity, and a liquid crystal material confined in the cavity;
continuous transparent conductive layers disposed on the inner surfaces of the substrates;
a first reflective polarizer disposed on the outer surface of the first substrate; and
a second reflective polarizer disposed on the outer surface of the second substrate; and
a system of driving electronics connected to the conductive layers;
wherein the first and second reflective polarizers each comprise a stack of at least 100 layer pairs, wherein each layer pair comprises a first positive birefringent layer adjacent to a second layer, wherein each layer pair has a thickness in the range from 100 to 500 nm, wherein the stack is uniaxially stretched at a ratio in the range of 4:1 to 7:1 and wherein each positive birefringent layer has an index of refraction in the stretch direction that is between 0.1 and 0.3 greater than the index of refraction in the transverse direction, so that the panel is electronically switchable between a reflecting state and a transmitting state.

14. The device of claim 13, wherein the first layer comprises PEN and the second layer comprises coPEN.

15. The device of claim 13, wherein the first layer comprises PEN and the second layer comprises sPS.

16. The device of claim 13, wherein the first layer comprises PEN and the second layer comprises cyclohexanedimethylene terephthalate.

17. A switchable optical device, comprising:
a switchable optical panel, comprising:
a liquid crystal device, comprising:
a pair of reflective polarizers in parallel register defining a cavity therebetween, the reflective polarizers each having an inner surface facing the cavity and an outer surface;
a liquid crystal material confined in the cavity; and
transparent conductive layers on the inner surfaces of the reflective polarizers; and
a system of driving electronics connected to the conductive layers, so that the panel is electronically switchable between a reflecting state and a transmitting state,
wherein the reflective polarizers each comprise a multilayered stack of pairs of adjacent material layers, each of the layer pairs exhibiting a refractive index difference between the adjacent layers in a first direction in the plane of the polarizer and exhibiting essentially no refractive index difference between adjacent layers in a second direction in the plane of the polarizer and orthogonal to the first direction.

18. A switchable window, comprising:
a switchable optical panel, comprising:
a liquid crystal device comprising first and second transparent planar substrates in parallel register defining a cavity therebetween, each substrate having an outer surface and an inner surface facing the cavity, and a liquid crystal material confined in the cavity;
a first reflective polarizer disposed on the outer surface of the first substrate of the liquid crystal; and
a second reflective polarizer disposed on the outer surface of the second substrate of the liquid crystal; and
means for electronically switching the panel between an open state and a closed state,
wherein the first and second reflective polarizers each comprise a multilayered stack of pairs of adjacent material layers each of the layers exhibiting a refractive index difference between the adjacent layers in a first direction in the plane of the polarizer and exhibiting essentially no refractive index difference between adjacent layers in a second direction in the plane of the polarizer and orthogonal the first direction.

19. The window of claim 18, further comprising at least one transparent pane positioned adjacent and parallel to the switchable optical panel.

20. The window of claim 18, further comprising a pair of transparent panes in parallel register defining a space therebetween, wherein the switchable optical panel is positioned in the space between the panes and parallel thereto.

21. The window of claim 18, further comprising a first transparent pane and a second transparent pane in parallel register defining a space therebetween, each pane having an outer surface opposite the space, wherein the switchable optical panel is positioned on the outer surface of one of the panes.

22. The window of claim 18, wherein the liquid crystal device is a twisted nematic liquid crystal device.

23. The window of claim 18, wherein the first and second reflective polarizers each comprise a multilayered sheet of alternating layers of first and second materials, each layer having an average thickness of less than 0.5 µm, wherein the first material exhibits stress-induced birefringence and the sheet is uniaxially stretched.

24. The window of claim 18, wherein the electronic switching means comprises continuous transparent conductive layers on the inner surfaces of the substrates of the liquid crystal device and a system of driving electronics connected to the conductive layers for applying voltage across the liquid crystal device.

25. The window of claim 18, wherein the liquid crystal device is a twisted nematic liquid crystal device having an angle of rotation in the range from 80° to 90°, and wherein the polarization orientation of the first reflective polarizer is orthogonal to the polarization orientation of the second reflective polarizer.

26. The window of claim 18, wherein the liquid crystal device is a twisted nematic liquid crystal device having an angle of rotation in the range from 80° to 90°, and wherein the polarization orientation of the first reflective polarizer is parallel to the polarization orientation of the second reflective polarizer.

27. The window of claim 18, wherein the second reflective polarizer has an outer surface, wherein a first absorptive polarizer is disposed between the first reflective polarizer and the liquid crystal device, and a second absorptive polarizer is disposed on the outer surface of the second reflective polarizer, wherein the polarization orientation of the first absorptive polarizer is parallel to the polarization orientation of the first reflective polarizer and the polarization orientation of the second absorptive polarizer is parallel to the polarization orientation of the second reflective polarizer.

28. A switchable window, comprising:
   a first transparent pane having first and second major surfaces;
   a first reflective polarizer disposed on the first transparent pane;
   at least one shutter comprising a second transparent pane, a second reflective polarizer disposed on the second transparent pane, and a birefringent layer disposed on a side of the second transparent pane opposite the second reflective polarizer; and
   means for rotating the shutter to position either the birefringent layer or the second reflective polarizer adjacent and parallel to the first reflective polarizer, so that the window is mechanically switchable between an open and a closed state,
wherein the reflective polarizer comprises a multilayered stack of pairs of adjacent material layers, each of the layer pairs exhibiting a refractive index difference between the adjacent layers in a first direction in the plane of the polarizer and exhibiting essentially no refractive index difference between adjacent layers in a second direction in the plane of the polarizer and orthogonal to the first direction.

29. A transflective optical display, comprising:
   a liquid crystal display device comprising a front absorptive polarizer, a rear absorptive polarizer and a pixellated liquid crystal display device located therebetween;
   a backlight for illuminating the liquid crystal display device;
   an optical diffuser located between the liquid crystal display device and the backlight; and
   a switchable transflector located between the optical diffuser and the backlight, the switchable transflector comprising:
      a non-pixellated liquid crystal device, comprising:
         a front substrate, facing the optical diffuser, and a rear substrate in parallel register and defining a cavity therebetween, each of the substrates having an inner surface facing the cavity and an outer surface;
         a conductive material on the inner surface of each substrate; and
         a liquid crystal material confined in the cavity;
      the non-pixellated liquid crystal device having a front alignment direction associated with the front substrate and a rear alignment direction associated with the rear substrate;
      a reflective polarizer disposed on the rear substrate of the non-pixellated liquid crystal display device and proximate to the backlight; and
      means for electronically switching the transflector between a reflecting state and a transmitting state, wherein the polarization orientation of the rear absorptive polarizer is parallel to the front alignment direction of the non-pixellated liquid crystal device.

30. The optical display of claim 29, wherein the non-pixellated liquid crystal device is a twisted nematic liquid crystal device and the polarization orientation of the reflective polarizer is parallel to the polarization orientation of the rear absorptive polarizer.

31. The optical display of claim 30, wherein the polarization orientation of the reflective polarizer is orthogonal to the rear alignment direction of the pixellated liquid crystal display device.

32. The transflective optical display of claim 30, wherein the polarization orientation of the reflective polarizer is parallel to the rear alignment direction of the pixellated liquid crystal display device.

33. The transflective optical display of claim 29, further comprising a second reflective polarizer disposed on the from surface of the non-pixellated liquid crystal device and proximate to the optical diffuser, wherein the polarization orientation of the second reflective polarizer is parallel to the polarization orientation of the rear absorptive polarizer.

34. A transflective optical display as claimed in claim 29, wherein the reflective polarizer comprises a multilayered stack of pairs of adjacent material layers, and each of the layer pairs exhibits a refractive index difference between the adjacent layers in a first direction in the plane of the polarizer which is greater than a refractive index difference between adjacent layers in a second direction in the plane of the polarizer and orthogonal to the first direction.

35. A transflective optical display as claimed in claim 34, wherein the refractive index difference between the adjacent layers in the first direction exceeds the refractive index difference between adjacent layers in the second direction by at least 0.05.

36. A transflective optical display as claimed in claim 34, wherein the reflective polarizer comprises a multilayered sheet of alternating layers of first and second material, wherein the first material exhibits stress-induced birefringence and the sheet is uniaxially stretched.

37. A transflective optical display as claimed in claim 36, wherein the first material is a napthalene dicarboxylic acid polyester and the second material is selected from the group consisting of polystyrene, polyethylene napthalate, polyethylene terepthalate and cyclohexanedimethylene terepthalate.

38. A transflective optical display as claimed in claim 37, wherein the first material is selected from the group consisting of polyethylene napthalate, polyethylene terepthalate, polyethylene isopthalate, and copolymers thereof.

39. A transflective optical display as claimed in claim 34, wherein a refractive index difference between adjacent layers in a third direction orthogonal to the plane of the polarizer is less than about 0.2 times the refractive index difference between the adjacent layers in the first direction.

40. A switchable optical device, comprising:
a switchable optical panel, comprising:
a transparent optically active layer having a first and a second major surface;
a first reflective polarizer disposed on the first major surface of the optically active layer; and
a second reflective polarizer disposed on the second major surface of the optically active layer; and
means for switching the panel between a reflecting state and a transmitting state,
wherein the first and second reflective polarizers each comprise a multilayered stack of pairs of adjacent material layers, and each of the layer pairs exhibits a refractive index difference between the adjacent layers in a first direction in the plane of the polarizer which is greater than a refractive index difference between adjacent layers in a second direction in the plane of the polarizer and orthogonal to the first direction.

41. A switchable optical device as claimed in claim 40, wherein the refractive index difference between the adjacent layers in the first direction exceeds the refractive index difference between adjacent layers in the second direction by at least 0.05.

42. A switchable optical device as claimed in claim 40, wherein the refractive index difference between the adjacent layers in the first direction exceeds the refractive index difference between adjacent layers in the second direction by at least 0.10.

43. A switchable optical device as claimed in claim 40, wherein the refractive index difference between the adjacent layers in the first direction exceeds the refractive index difference between adjacent layers in the second direction by at least 0.20.

44. A switchable optical device as claimed in claim 40, wherein the first and second reflective polarizers each comprise a multilayered sheet of alternating layers of first and second material, wherein the first material exhibits stress-induced birefringence and the sheet is uniaxially stretched.

45. A switchable optical device as claimed in claim 40, wherein the first material is a napthalene dicarboxylic acid polyester and the second material is selected from the group consisting of polystyrene, polyethylene napthalate, polyethylene terepthalate and cyclohexanedimethylene terepthalate.

46. A switchable optical device as claimed in claim 45, wherein the first material is selected from the group consisting of polyethylene napthalate, polyethylene terepthalate, polyethylene isopthalate, and copolymers thereof.

47. A switchable optical device as claimed in claim 40, wherein a refractive index difference between adjacent layers in a third direction orthogonal to the plane of the polarizer is less than about 0.2 times the refractive index difference between the adjacent layers in the first direction.

48. A switchable optical device as claimed in claim 40, wherein a refractive index difference between adjacent layers in a third direction orthogonal to the plane of the polarizer is less than about 0.1 times the refractive index difference between the adjacent layers in the first direction.

49. A device, comprising:
a switchable optical panel, comprising:
a twisted nematic liquid crystal device comprising first and second transparent substrates in parallel register defining a cavity therebetween, each substrate having an outer surface and an inner surface facing the cavity, and a liquid crystal material confined in the cavity;
continuous transparent conductive layers disposed on the inner surfaces of the substrates;
a first reflective polarizer disposed on the outer surface of the first substrate; and
a second reflective polarizer disposed on the outer surface of the second substrate; and
a system of driving electronics connected to the conductive layers; wherein the first and second reflective polarizers each comprise a multilayered stack of pairs of adjacent material layers, and each of the layer pairs exhibits a refractive index difference between the adjacent layers in a first direction in the plane of the polarizer which is greater than a refractive index difference between adjacent layers in a second direction in the plane of the polarizer and orthogonal to the first direction.

50. A device as claimed in claim 49, wherein the refractive index difference between the adjacent layers in the first direction exceeds the refractive index difference between adjacent layers in the second direction by at least 0.05.

51. A device as claimed in claim 49, wherein the first and second reflective polarizers each comprise a multilayered sheet of alternating layers of first and second material, wherein the first material exhibits stress-induced birefringence and the sheet is uniaxially stretched.

52. A device as claimed in claim 49, wherein the first material is a napthalene dicarboxylic acid polyester and the second material is selected from the group consisting of polystyrene, polyethylene napthalate, polyethylene terepthalate and cyclohexanedimethylene terepthalate.

53. A device as claimed in claim 52, wherein the first material is selected from the group consisting of polyethylene napthalate, polyethylene terepthalate, polyethylene isopthalate, and copolymers thereof.

54. A device as claimed in claim 49, wherein a refractive index difference between adjacent layers in a third direction orthogonal to the plane of the polarizer is less than about 0.2 times the refractive index difference between the adjacent layers in the first direction.

55. A switchable optical device, comprising:
a switchable optical panel, comprising:
a liquid crystal device, comprising:
a pair of reflective polarizers in parallel register defining a cavity therebetween, the reflective polarizers each having an inner surface facing the cavity and an outer surface;
a liquid crystal material confined in the cavity; and
transparent conductive layers on the inner surfaces of the reflective polarizers; and
a system of driving electronics connected to the conductive layers, so that the panel is electronically switchable between a reflecting state and a transmitting state; and
wherein the reflective polarizers each comprise a multilayered stack of pairs of adjacent material layers, and each of the layer pairs exhibits a refractive index difference between the adjacent layers in a first direction in the plane of the polarizer which is greater than a refractive index difference between adjacent layers in a second direction in the plane of the polarizer and orthogonal to the first direction.

56. A switchable optical device as claimed in claim 55, wherein the refractive index difference between the adjacent layers in the first direction exceeds the refractive index difference between adjacent layers in the second direction by at least 0.05.

57. A switchable optical device as claimed in claim 55, wherein the reflective polarizers each comprise a multilayered sheet of alternating layers of first and second material, wherein the first material exhibits stress-induced birefringence and the sheet is uniaxially stretched.

58. A switchable optical device as claimed in claim 57, wherein the first material is a napthalene dicarboxylic acid polyester and the second material is selected from the group consisting of polystyrene, polyethylene napthalate, polyethylene terepthalate and cyclohexanedimethylene terepthalate.

59. A switchable optical device as claimed in claim 58, wherein the first material is selected from the group consisting of polyethylene napthalate, polyethylene terepthalate, polyethylene isopthalate, and copolymers thereof.

60. A switchable optical device as claimed in claim 55, wherein a refractive index difference between adjacent layers in a third direction orthogonal to the plane of the polarizer is less than about 0.2 times the refractive index difference between the adjacent layers in the first direction.

61. A switchable window, comprising:

a switchable optical panel, comprising:

a liquid crystal device comprising first and second transparent planar substrates in parallel register defining a cavity therebetween, each substrate having an outer surface and an inner surface facing the cavity, and a liquid crystal material confined in the cavity;

a first reflective polarizer disposed on the outer surface of the first substrate of the liquid crystal; and a second reflective polarizer disposed on the outer surface of the second substrate of the liquid crystal; and means for electronically switching the panel between an open state and a closed state; and wherein the first and second reflective polarizers each comprise a multilayered stack of pairs of adjacent material layers, and each of the layer pairs exhibits a refractive index difference between the adjacent layers in a first direction in the plane of the polarizer which is greater than a refractive index difference between adjacent layers in a second direction in the plane of the polarizer and orthogonal to the first direction.

62. A switchable window as claimed in claim 61, wherein the refractive index difference between the adjacent layers in the first direction exceeds the refractive index difference between adjacent layers in the second direction by at least 0.05.

63. A switchable window as claimed in claim 62, wherein the first and second reflective polarizers each comprise a multilayered sheet of alternating layers of first and second material, wherein the first material exhibits stress-induced birefringence and the sheet is uniaxially stretched.

64. A switchable window as claimed in claim 63, wherein the first material is a napthalene dicarboxylic acid polyester and the second material is selected from the group consisting of polystyrene, polyethylene napthalate, polyethylene terepthalate and cyclohexanedimethylene terepthalate.

65. A switchable window as claimed in claim 64, wherein the first material is selected from the group consisting of polyethylene napthalate, polyethylene terepthalate, polyethylene isopthalate, and copolymers thereof.

66. A switchable window as claimed in claim 61, wherein a refractive index difference between adjacent layers in a third direction orthogonal to the plane of the polarizer is less than about 0.2 times the refractive index difference between the adjacent layers in the first direction.

67. A switchable window, comprising:

a first transparent pane having first and second major surfaces;

a first reflective polarizer disposed on the first transparent pane;

at least one shutter comprising a second transparent pane, a second reflective polarizer disposed on the second transparent pane, and a birefringent layer disposed on a side of the second transparent pane opposite the second reflective polarizer; and means for rotating the shutter to position either the birefringent layer or the second reflective polarizer adjacent and parallel to the first reflective polarizer, so that the window is mechanically switchable between an open and a closed state; and wherein the first and second reflective polarizers each comprise a multilayered stack of pairs of adjacent material layers, and each of the layer pairs exhibits a refractive index difference between the adjacent layers in a first direction in the plane of the polarizer which is greater than a refractive index difference between adjacent layers in a second direction in the plane of the polarizer and orthogonal to the first direction.

68. A switchable window as claimed in claim 67, wherein the refractive index difference between the adjacent layers in the first direction exceeds the refractive index difference between adjacent layers in the second direction by at least 0.05.

69. A switchable window as claimed in claim 67, wherein the first and second reflective polarizers each comprise a multilayered sheet of alternating layers of first and second material, wherein the first material exhibits stress-induced birefringence and the sheet is uniaxially stretched.

70. A switchable window as claimed in claim 69, wherein the first material is a napthalene dicarboxylic acid polyester and the second material is selected from the group consisting of polystyrene, polyethylene napthalate, polyethylene terepthalate and cyclohexanedimethylene terepthalate.

71. A switchable window as claimed in claim 70, wherein the first material is selected from the group consisting of polyethylene napthalate, polyethylene terepthalate, polyethylene isopthalate, and copolymers thereof.

72. A switchable window as claimed in claim 67, wherein a refractive index difference between adjacent layers in a third direction orthogonal to the plane of the polarizer is less than about 0.2 times the refractive index difference between the adjacent layers in the first direction.

* * * * *

UNITED STATES PATENT AND TRADEMARK OFFICE
CERTIFICATE OF CORRECTION

PATENT NO. : 5,686,979
DATED : November 11, 1997
INVENTOR(S) : Michael F. Weber, Andrew J. Ouderkirk, and David J. W. Aastuen It is certified that error appears in the above-indentified patent and that said Letters Patent is hereby corrected as shown below:

Col. 21, Line 48: "in claim 40." should read ---in claim 44.---

Col. 18, Line 49: "layers" should read --layers,"

Col. 18, Line 54: "orthogonal the first direction." should read --orthogonal to the first direction.--

Signed and Sealed this

Twenty-eighth Day of September, 1999

Attest:

Q. TODD DICKINSON

*Attesting Officer*            *Acting Commissioner of Patents and Trademarks*